United States Patent [19]

Simmons

[11] Patent Number: 5,676,868
[45] Date of Patent: Oct. 14, 1997

[54] HEATING WINDSHIELD WIPER SHROUD SYSTEM

[76] Inventor: David L. Simmons, P.O. Box 4112, Sevierville, Tenn. 37864-4112

[21] Appl. No.: 603,921

[22] Filed: Feb. 22, 1996

[51] Int. Cl.$^6$ .................. B60S 1/02; H05B 3/18
[52] U.S. Cl. .......... 219/202; 219/542; 219/544; 15/250.05
[58] Field of Search ............. 219/202–203, 219/528, 542, 544, 549; 15/250.05–250.07, 250.001–250.003; D12/219–220

[56] References Cited

U.S. PATENT DOCUMENTS

| | | | |
|---|---|---|---|
| 2,727,270 | 12/1955 | Bosso | 15/250.07 |
| 3,034,166 | 5/1962 | Bell | 15/250.07 |
| 3,074,096 | 1/1963 | Van Hess | 15/250.07 |
| 3,408,678 | 11/1968 | Linker | 15/250.05 |
| 3,447,186 | 6/1969 | Senkewich | 15/250.07 |
| 3,523,626 | 8/1970 | Racine et al. | 15/250.07 |
| 5,325,561 | 7/1994 | Kotlar | 15/250.06 |

FOREIGN PATENT DOCUMENTS

| | | | |
|---|---|---|---|
| 4781 | 6/1989 | WIPO | 15/250.05 |

*Primary Examiner*—Teresa J. Walberg
*Assistant Examiner*—Raphael Valencia
*Attorney, Agent, or Firm*—M. Alex Brown, Patent Attorney

[57] ABSTRACT

A heating windshield wiper shroud system which is designed to be installed in combination with a conventional motorized vehicle windshield wiper assembly having an electrically activated windshield wiper rocker arm and a windshield wiper blade and supporting frame. The wiper shroud system utilizes a shroud housing with a roof portion along a longitudinal axis having a middle section with a first vertically and transversely designed upper width portion and a second vertically and transversely designed lower width portion which has a differentially wider transverse width dimension than the first upper width portion. The second lower width portion has a shelf portion which has a perimeter generally between and coextensive with the outside vertical edge of the first upper width and the outer edge of the second lower width portion. The shroud housing is further provided with an internal channel along its longitudinal length for installation of a conventional wiper blade assembly, a channel transversely positioned within the upper width of the middle section for receipt of a pin securing a wiper arm, and a channel transversely positioned within the lower width for pinned securement of a wiper blade. A biasing clip member is are utilized adjacent to each of the transverse channels to secure pin members; and an electrical heating element system, interfaced with the vehicle's power system, is mounted adjacent to the roof portion of the shroud on opposite sides of the middle section to provide heat energy adjacent to and above a wiper blade installed in the shroud housing.

18 Claims, 15 Drawing Sheets

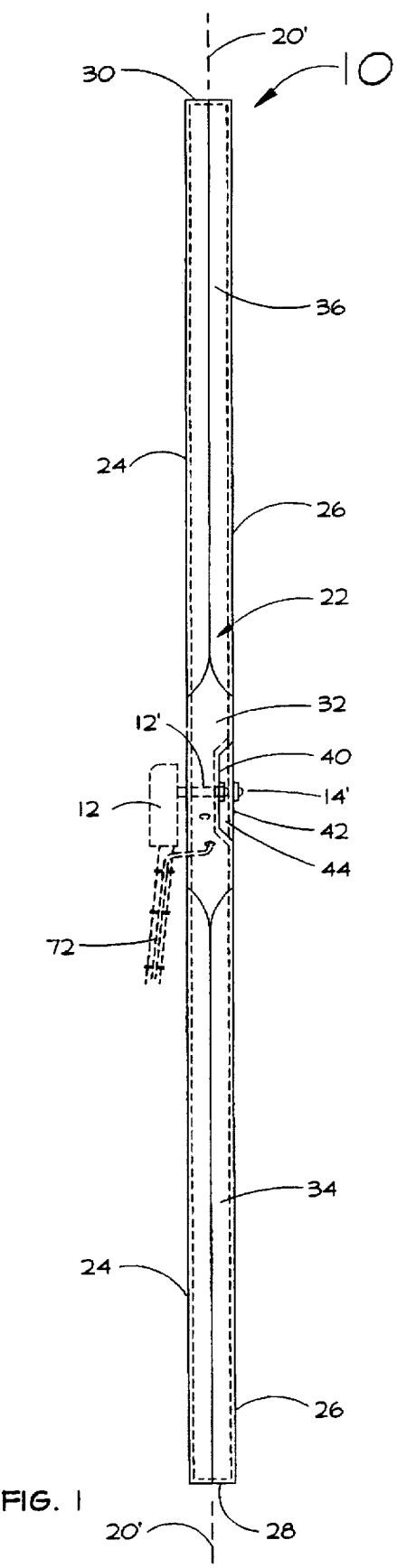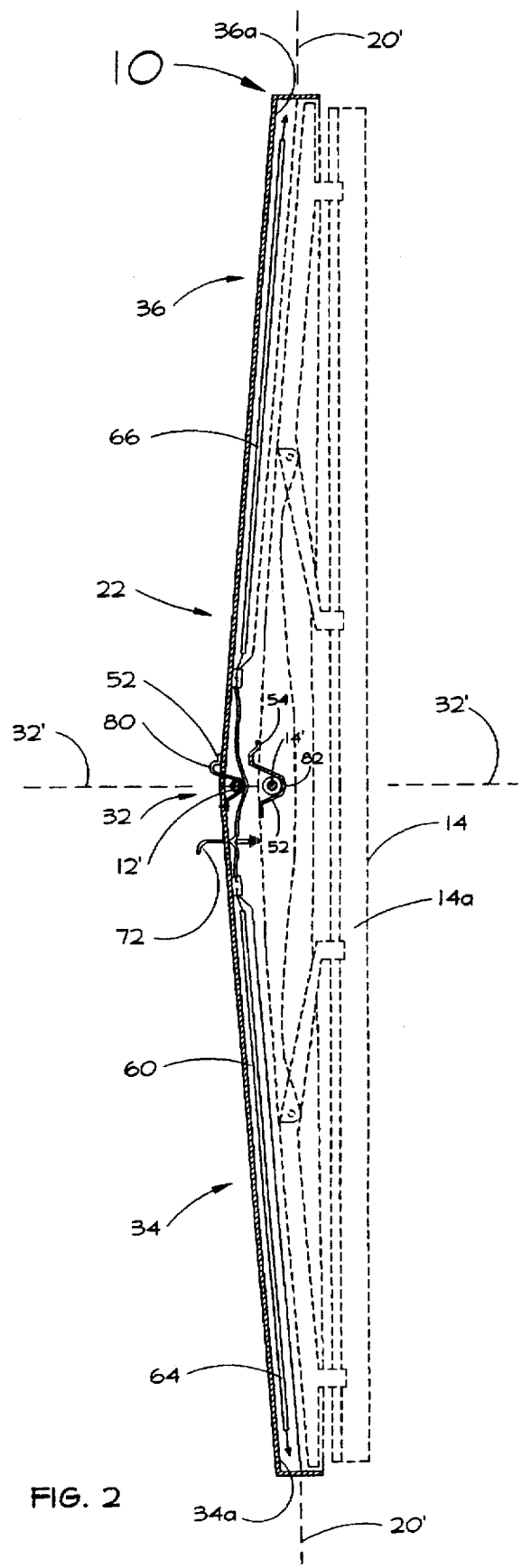
FIG. 1
FIG. 2

HEATING WINDSHIELD WIPER SHROUD SYSTEM

BACKGROUND INFORMATION

Typical of the prior art references regarding heated windshield wipers for use in an automotive vehicle are U.S. Pat. Nos. 5,325,561; 4,928,345; 4,670,933; 4,603,451; 4,497,083; 4,360,941; 3,619,556; Des. Pat. No. 342,225; Des. Pat No. 341,115; Des. Pat. No. 324,014; issued respectively to Kotlar, Meltzer et al., Toplensky, VanSickle, Nielsen, Jr. et al., Mabie, Delbel et al., Heckman et al., Papania, and Runiner; each of which was located during the course of a patent search; each being enclosed by full or gazette copy with the application herein as filed.

The Kotlar '561 patent discloses a windshield wiper assembly having a thin heater wire structured within the length of a flexible wiper blade, with the wiper blade being enclosed within a flexible cover which defines a dead air space heated somewhat by the heater element in the wiper blade. This device is not meant to be utilized with or replaceable by a conventional wiper blade, as in the case of the present invention, nor does the cover otherwise support any type of heating means.

Additionally, there have been many attempts to improve the wiping function of a windshield wiper in cleaning the outer surface of a windshield in cold weather; and various efforts in attempting to solve the problem of providing proper wiping performance in extremely frigid, snowy or icy conditions while also removing and keeping the wiper blade, frame and linkages free from interference by ice and snow, or otherwise flexible such that a special wiper blade would function on the surface of the vehicle windshield.

In this regard, the Meltzer et al. '345 patent discloses another of many specially adopted wiper blade assemblies wherein the electrical heating and resistance means is provided within the special blade member itself, with no use disclosed or intended with conventional vehicle wiper blade assemblies already provided with the vehicle. Along these similar lines the Ruminer Des. '014 patent discloses a design for a heated windshield wiper.

The Nielsen et al. '083 patent discloses a heated windshield wiper blade having a resistance wire running along the length of the wiper arm, the blade carrier and the wiper blade for the purpose of heating the blade and the carrier when it is connected to a vehicle's electrical system. In Nielsen, the path through which the heating-resistance wire travels, and the various associated connections, are reasonably complex for satisfying the purpose therein of providing the blade, which, in that case, is a non-conventional, replaceable blade, with a function of being independently replaced in reference to its arm and carrier.

The Mabie '941 patent discloses a fairly complex windshield wiper assembly which incorporates a weather protective hood utilizing electrical conductors affixed on the outer wall of the hood and other conductors affixed on the inner wall of the hood to heat the hood and frame of this device to prevent the accumulation of ice.

The Deibel et al. '556 patent discloses a heated windshield wiper blade, described as an electrically heated weatherproof wiper blade. Deibel is, therefore, in the genre of the prior art where a specially adopted wiper blade element is provided with the device. Disclosed is a windshield wiper blade and arm assembly in which the blade has a pressure-distributing superstructure including a number of pivotally connected levers and a flexible backing strip for retaining a specially adopted rubber squeegee member. The superstructure and backing strip of Deibel are enclosed by an envelope of rubber or rubberlike material with a squeegee element extending exterior or outside of the envelope portion. The wiper blade of Deibel is provided with a heating element secreted between the squeegee member and its pressure applying and distributing frame. The envelope and the squeegee are both constructed from insulating material which, thereby, serve as electrical insulators for the heating element utilized in this invention The Toplenszky '933 patent discloses a wiper blade which is mounted within a mounting strip having an electrical heating resistance material therein; and the VanSickle '451 patent is of similar structure and function in disclosing a wiper assembly supported by a structure having a heating element with thermostat means. Neither Toplenszky nor VanSickle are provided with any type of heat supplied cover means; nor is either designed to be utilizable with a conventional wiper element and unit typically and conventionally provided with automobiles and trucks, or other vehicles.

Additionally, the Heckman et al. Des. '225 design patent discloses a wiper arm cover, which is not provided structurally or functionally with any type of pivotable or rotatable attachment means for connection to conventional wiper arm assemblies normally provided with motorized vehicles having windshields; nor is Heckman provided with heating means or moveable or pivotable attachment means for receiving a conventional wiper blade assembly. The structure, design and function are also distinguishable from that of the present invention's shroud assembly and system.

None of the references found and cited specifically illustrates the heating windshield wiper shroud system of the present invention. Nor is the present invention obvious in view of any of the prior art references listed herein. In addition, all of the relevant prior art heretofore known suffer from a number of disadvantages.

It will otherwise be indicated that none of the apparently crowded, prior art references herein teach concepts which provide a relatively simple and distinguishably improved assembly for a heated windshield wiper shroud system which provides specially bowed shroud means having a differentially spaced and widthed upper middle portion when viewed from a top view in longitudinal cross-section; so that a first upper smaller differential width spacing can receive a clippable pin to hold the shroud housing to a conventional wiper arm provided with a vehicle, and a second lower wider differential width spacing at this upper middle portion of the shroud housing can receive a second clippable pin to hold a conventional wiper blade within the shroud for heating and pivotable movement within and adjacent to the shroud of the present invention, with a heating means being supported by the internal roof portions of end portions of the shroud so that heating is provided directly above and adjacent to the installed conventional wiper blade assembly.

In the past, the prior art heated windshield wiper devices which could be utilized in any reasonable manner on conventional wiper arms provided with vehicles, have suffered from functionally and structurally deficient wiper blades, heating elements and placement and effective heating ability, ice and sludge prevention ability, wiper frame support and movement ability, covering design and shape/contour, spacing and support ability of any covering utilized in relationship to a wiper blade, complexity and prolixity of electrical heating resistance construction and logistical placement, and the ability to be utilized reasonably, or in any manner, with already-available, conventional wiper blade units such as those provided with a vehicle; as well, otherwise, as complexity of construction.

There have been problems of design and construction in providing a covered and housed system which could both attach and be installable on both a conventional wiper arm provided as part of the construction of a vehicle and a conventional wiper blade characteristically also provided with a vehicle, being workably attached and functionally installed to each at the same time, with no specially adopted wiper blade containing an electrical heating element being necessary.

These and other disadvantages, structurally and functionally, of the prior art will become apparent in reviewing the remainder of the present specification, claims and drawings.

Accordingly, it is an object of the present invention to provide a substantially improved heating windshield wiper shroud system and assembly for installation and combination with a conventional wiper arm member and a conventional wiper blade, conventionally and characteristically provided with the same vehicle, for installable and secure use with each of these members at the same time.

It is a further object of the present invention to provide a substantially improved, simplified and more easily manufactured, heated windshield wiper shroud housing and assembly, having an improved design, contour and shape for connection and installation to and with a conventional wiper arm and wiper blade such that a conventional wiper blade is provided with adjacent support, flexible movement and heating for more efficient movement and function on the outer surface of a vehicle windshield during frigid, icy or cold weather conditions.

It is a further object of the invention to provide a variable heating resistance element or means which is placed more simply and advantageously within a specially designed, shaped and adopted shroud housing for more efficient heating and protection from the cold weather elements.

It is yet a further object of the present invention to provide a substantially improved, and otherwise novel and superior shroud housing assembly having a special middle portion differentially spaced in width longitudinally at two different vertical positions, to receive a first upper pin to secure the wiper arm unit and a second lower pin to secure a conventional wiper blade unit, with the electical heating element or resistance means being provided at first and second lateral end portions outside the middle portion of the shroud supporting the wiper arm and the wiper blade.

Additionally, it is a further object of the invention by utilization of its specially adopted shroud housing to provide easier and more efficient access for electrical power means from the vehicle's own power source to provide activation to the heating means of the invention's shroud.

A further object of the present invention is to provide a substantially and distinguishably novel and improved heating wind-shield wiper shroud system and assembly which is shaped, constructed and otherwise adopted to allow, permit and assist movement of a conventional wiper blade unit on the outer surface of a vehicle windshield during icy, frigid and cold weather conditions, providing pivotable or rotational movement of the wiper blade within and adjacent to a shroud housing while providing at the same time adjacent and functional heating to the frame elements of a conventional wiper blade unit such that the wiper blade will be more flexible in more easily and functionally sliding across and over the wind-shield of a vehicle.

A further object is to provide a dual biasable and lockable clip means at each differential width apacing of the shroud for respective securement of the wiper arm (or wiper arm pin) and the wiper blade unit conventionally available with a vehicle.

It will, therefore, be understood that substantial and distinguishable structural and functional advantages are realized in the present invention over the prior art devices with regard to the shroud housing of the invention providing two level, locked support at differentially spaced width portions of the shroud's middle section for secure support and movement of a respective wiper arm unit and a respective wiper blade unit, conventionally provided with vehicles, and for advantageous and improved protection and adjacent heating of the wiper blade unit when in a supported position within the shroud.

SUMMARY OF THE INVENTION

The foregoing and other objects of the invention can be achieved with the present invention device, assembly and system which is a heating windshield wiper shroud system which is adopted for mounting, installation and operative combination on and with a conventional motorized vehicle windshield wiper assembly having an electrically activated, moveable or pivotable windshield wiper holding arm portion and a conventionally installed, replaceable wiper blade and frame assembly portion typically provided with a pin for attachment to the conventional wiper holding arm; but also utilizable with other available prior art windshield wiper assemblies. The invention is provided with a shroud housing having a longitudinally oriented roof portion, a pair of longitudinal wall portions and a pair of width oriented end wall portions. The roof portion is provided with a middle section and first and second lateral sections. The middle section of the invention has and defines a first vertically disposed upper width and a second vertically disposed lower width, each substantially defined along the axes vertical and transverse to the longitudinal axis of the roof portion. The second vertically disposed lower width is provided with a differentially wider width dimension, transverse to the longitudinal axis, than the upper width; and in this differential relationship and design the middle section of the invention is thereby provided with at least one transversely and vertically oriented shelf portion located substantially at the lower width of the middle section of the invention. Each of the first and second longitudinally oriented lateral sections of the roof portion of the invention are concurrent and coextensive, in their perimeters, with and between the shelf portion at the lower width of the middle section and each respective first and second width oriented end wall portion. The shroud housing of the invention has and defines an inner channel for installation of a conventional wiper blade and frame assembly. Additionally, the upper width of the middle section defines a first channel for receipt and pinned securement of a conventional vehicle wiper holding arm; and the lower width of the middle section defines a second channel for receipt and pinned securement of a conventional vehicle wiper blade and frame assembly, typically available in the prior art. Electrical resistance heating element means is mounted within each of the internally spaced upper roof portions of the inner channel of the shroud, within and adjacent to each of the first and second lateral sections of the roof portion of the shroud, having the capacity for variable electrical current and heating and overheating thermostat-protection; for providing radiating heat adjacent to and generally above an installed conventional wiper blade assembly when installed in the inner channel of the shroud of the present invention.

BRIEF DESCRIPTION OF THE DRAWINGS

FIG. 1 is a top view of a preferred embodiment of the novel heating windshield wiper shroud system, illustrating in part one conventional motorized vehicle windshield wiper assembly; and inside wall and shelf portions of the invention.

FIG. 2 is a cross-sectional side view of a preferred embodiment of the invention, illustrating in part the installation of a conventional vehicle wiper blade and frame assembly.

REFERENCE NUMBERS IN DRAWINGS

Figure 3:
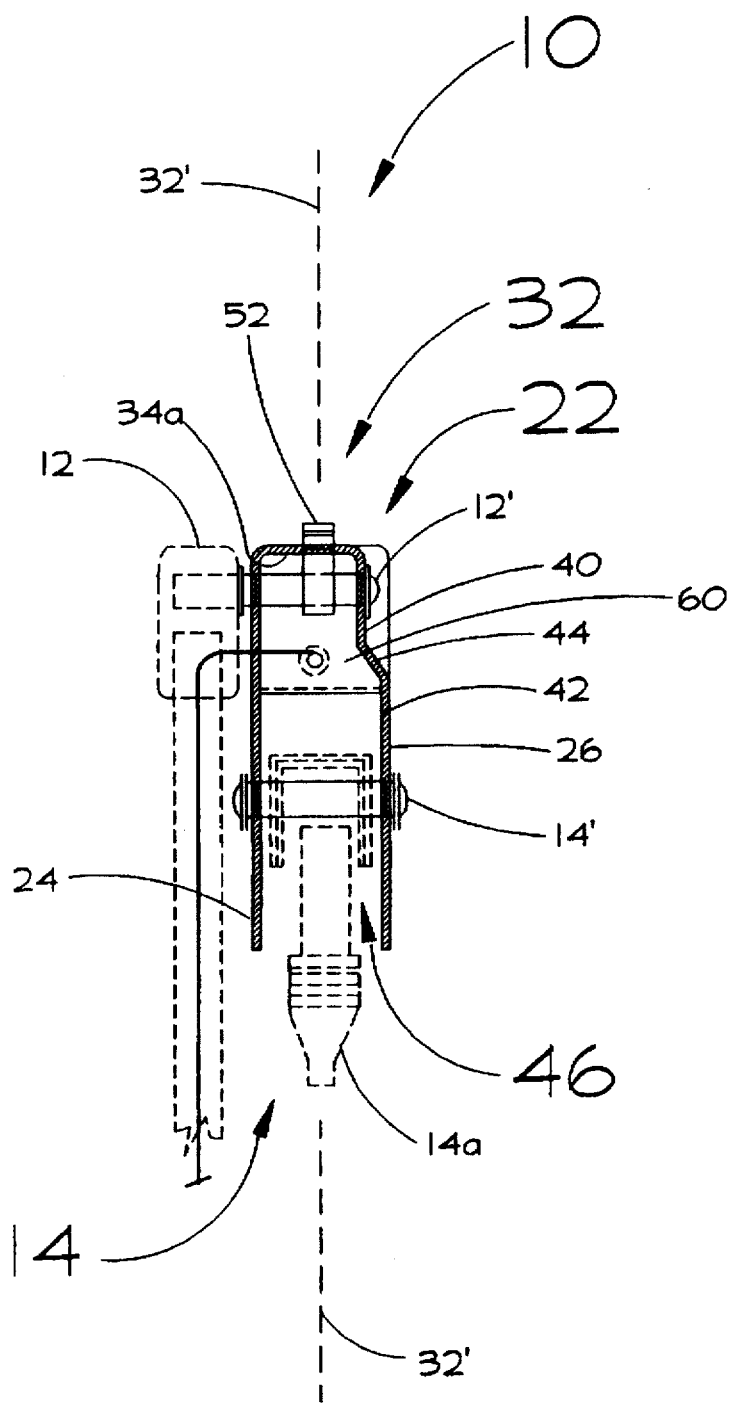
FIG. 3 is an end, cross-sectional view taken along a vertical axis of a lateral end portion of the middle section of the roof portion of a preferred embodiment of the invention, illustrating in part the installation and attachment of one of many utilizable, conventional windshield wiper arm, and wiper blade and frame assemblies.

10 Shroud System
12 Conventional Wiper Arm
12A Windshield
$12^1$ Conventional Vehicle Wiperarm Pin
14 Conventional Wiper Blade And Frame Assembly
$14^1$ Conventional Blade Connection Pin
14a Wiper Blade Member (14)
14b Pivotable Wiper Support Frame (14)
20 Shroud Housing
$20^1$ Shroud Housing Horizontal Longitudinal Axis (20)
22 Longitudinally Oriented Roof Portion (20)
24 First Longitudinal Wall Portion (20)
26 Second Longitudinal Wall Portion (20)
28 First Width Oriented End Wall Portion (20)
30 Second Width Oriented End Wall Portion (20)
32 Middle Section (22)
$32^1$ Vertical Axis of Middle Section (22)
34 First Lateral Section (22)
34a Inside Surface (34) (46)
36 Second Lateral Section (22)
36a Inside Surface (36) (46)
40 First Vertically Disposed Upper Width Portion (32)
42 Second Vertically Disposed Lower Width Portion (32)
44 Shelf Portion (32)
46 Inner Wiper Blade Guide Channel (20)

48 First Pin-Channel (40) (32)
50 Second Pin-Channel (40) (32)
52 First Biasable Clip (20)
54 Second Biasable Clip (20)
60 Electrical Resistance Heating Element Means (20)
62 Heating Insulation Material (46)
64 First Resistor Heating Element (60)
66 Second Resistor Heating Element (60)
68 First Overheat Protection Thermostat (60)
70 Second Overheat Protection Thermostat (60)
72 Electrical Activation Wiring Means (60)
80 First Parabola-Shaped Portion (52, 54)
82 Second Parabola-Shaped Portion (52, 54)
90 Clip Compressing Tool Opening (20) (50)
92 Offset Key Member
94 Offset Portion (92)
100 Rectangular Wall Member
102 First Wall (100)
104 Second Wall (100)
106 Third End Wall (100)
120 Curved Attachment Member (40) (20)
122 Curved Attachment End-Piece (12)
124 Cover Member
126 Spring Biased Member (124)
130 Heating Means Retaining Shield Member
140 First Flexible Closure Member (20) (34) (36)
142 Second Flexible Closure Member (20) (34) (36)
144 Third Flexible Closure Member (20) (34) (36)

DETAILED DESCRIPTION OF THE PREFERRED EMBODIMENTS OF THE INVENTION

The following description of the preferred embodiments of the concepts of this invention is made in reference to the accompanying figures.

Referring now to the drawings, and more particularly to FIGS. 1, 2, 3, 4, 5 and 6, thereof, there is shown an improved heating windshield wiper shroud system 10, of the present invention, which is constructed in accordance with the invention in being adaptable for the receipt, installation or the combined releasable attachment of a conventional motorized, widshield 12A bearing, vehicle windshield wiper rocker or pivotable arm 12 and a conventional vehicle windshield wiper blade 14a and supporting frame assembly 14, resting on the windshield 12A depicted in the drawings for illustration purposes.

A conventional wiper blade and frame assembly in the present art is characteristically provided with a rubber-like wiper blade member 14a, normally flexible in temperatures (and weather conditions) above those considered to be frigid, freezing or below the freezing point for the material used in constructing the blade member 14a; and a pivotable wiper support frame 14b which is connected to and supports the blade 14a, and allows it to flex or change longitudinal configuration in adjusting to the contour of a vehicle windshield 12A.

There are several significant, conventional windshield wiper arms 12 presently known and substantially utilized in the present prior art, as illustrated by example, for use for the present invention, in FIGS. 1, 3, 5, 6, 7, 8, 11, 12, 14 and 15. It will be appreciated that though these several examples of wiper arms 12 are illustrated, that the concepts and spirit of the invention will allow the present invention to be utilized in combination and installed attachment with a diverse range and number of wiper arms 12, both available in the present art and in the future art in this technology.

A number of conventional windshield wiper assemblies are known in the art having a moveable wiper arm holding a replaceable wiper blade and supporting frame unit. The wiper arm of this conventional assembly is characteristically powered by an electric motor activated by the D.C. power vehicle battery in a vehicle. The mechanical interface often involves: battery, wiring, electric motor, motor shaft, worm gear, crank, connecting rod, rack, pinion and wiper blade arm. The wiper arm depends on the crank to move it to and fro in pivotable motion. A worm gear reduces the motor speed, and the crank moves a rack of linking rod that drives the wiper blades in many vehicle wiper assemblies.

The teaching of the present invention permits the novel preferred embodiments of the shroud system 10 to fit, and be utilized in combination with, most types of wiper arm assemblies which are available and standard with various motorized vehicles manufactured, as illustrated in FIGS. 1, 3, 5, 7, 8, 11, 12, 14 and 15. The types of conventional wiper rocker, support arms presently available include, but are not limited to substantially: (a) those having pin installment end-portions, (b) those having coupable male-female receiving means for receiving a couplable rocker arm end flange member already attached to a windshield wiper characteristically used with this type of wiper arm, and (c) those having a curved attachment loop end; as illustrated generally in the above referenced drawings.

In a preferred embodiment of the invention the shroud system 10 of the present invention is provided with a shroud housing 20. This housing 20 is provided with a longitudinally oriented roof portion 22; a first longitudinal wall portion 24 and a second longitudinal wall portion 26, generally parallel to one another and connected by attachment or integrally to the roof portion 22; and a first width-oriented end wall portion 28 and a second width-oriented end wall portion 30, also, each, attached to the roof portion 22 and placed at opposite ends to one another on the shroud 20.

The roof portion 22 has a middle section 32 in its construction in accordance with the present invention, and is also provided with a first lateral section 34 and a second lateral section 36. The middle section 32 is also constructed in contour and shape to have and define along its vertical axis $32^1$; i.e., on the axis vertical to the shroud housing's horizontal-longitudinal axis $20^1$; a first vertically disposed upper width portion 40 and a second vertically disposed lower width portion 42. In this teaching of the present invention, the two width portions 40 and 42 have a differential dimensional width relationship to each other, the second lower width portion 42 being wider in width dimension than the first upper width portion 40. Because of this differential dimensional relationship, the middle section 32 has in the teaching of this design of the invention at least one vertically oriented or disposed shelf portion 44 located at the vertical position of the second lower width 42.

In a preferred embodiment of the invention, as illustrated in FIGS. 1, 3, 5, 11, 12, 14, 15, 17, 18 and 20; the first lateral section 34 and the second lateral section 36 of the roof portion 22 of the shroud housing 20 are concurrent and coextensive, that is, joining each other in their upper vertical boundaries, with the shelf portion 44 located at the lower width portion 42 of the middle section 32, and each respective first and second width end wall portion, 28 and 30 respectively; as illustrated in the cited illustrations.

In this manner the differential dimensioning of the present invention between the first vertically disposed upper width portion 40 and the second vertically disposed lower width portion 42, permits, by its design, the necessary smaller width of the upper width 40 for the purpose and use of more accommodatingly and functionally receiving a number of the dimensionally standardized pin members conventionally provided with wiper arms 12 in the prior art, while also permitting receipt and installation within the shroud housing 20 of the standardized conventional wiper blade and frame assemblies 14 by virtue of the larger, wider width dimensions generated vertically by virtue of the second lower width portion 42; the differential width relationship taught by the present invention thereby serving to allow the present invention to be combined in functional operation and use with both conventional wiper arms 12 and conventional wiper blade and frame assemblies 14; while providing shrouded, protected heating and warmth to the wiper blade 14 in improved substantial distinction over the prior art devices seeking to address the problem of heating already available, conventional vehicle windshield wiper equipment; as illustrated by example in FIGS. 3, 4, 5, 7, 8, 9, 14, 15, 16, 17, 18, 19 and 21.

In one of several preferred embodiments of the present invention, in this regard, the first vertically disposed upper width portion 40 of the middle section 32 of the shroud housing 20 is provided with dimensions of substantially from about 0.5 inch to about 1.0 inch, or from substantially about 12 mm to about 25.5 mm; and the second vertically disposed lower width portion 42 of the middle section 32 is provided with dimensions of substantially from about 0.5 inch to about 1.25 inch, or from about 12 mm to about 32 mm; while remaining consistent with the novel teaching of the present invention in providing a differential dimensional relationship between the first width portion 40 and the second width portion 42. Additionally, it will be understood that it is within the scope of the present invention to provide the portions 40 and 42 in other differential dimensions to satisfy the present invention's purpose and use in being utilized in combination with various types of conventional windshield wiper assemblies and systems.

In a preferred embodiment, the shroud housing 20 is provided with an inner wiperblade guide channel 46 for guided receipt, installation and securement of the conventional wiper blade and frame assembly 14 within the shroud housing 20.

The shroud 20 is also provided with a first pin-channel 48 across the upper width portion 40 of the middle section 32 for receipt and pinned securement, as discussed in part earlier, of a conventional vehicle wiper arm pin $12^1$ of a wiper arm 12 as illustrated by example in FIGS. 1, 2, 3, 5, 9, 11, 12, 13, 14, 15, 16, 20 and 21. The shroud is also further provided with a second pin-channel 50 across the lower width portion 42 of the middle section 32 for receipt and pinned securement, as also discussed, of a conventional vehicle wiper blade and frame 14, normally standardized under the prior art to be provided or utilized conventionally with a wiper blade connection pin $14^1$, as illustrated by example in the above referenced drawing illustrations.

The shroud housing 20 is further provided, in a preferred embodiment, with a first biasable clip 52 which is attached and supported in the shroud housing 20, adjacent to the first channel 48 of the upper width portion 40 of the middle section 32, for supplying secure releasable pressure to assist in securing the wiper arm pin $12^1$, as illustrated in FIGS. 2, 3, 5, 9, 11 and 15. The housing 20 also has a second biasable clip 54 which is attached and supported adjacent to the second channel 50 of the lower width portion 42 of the middle section 32, for supplying secure releasable pressure to assist in securing the wiper blade connection pin $14^1$, as illustrated in FIGS. 2, 7, 8 and 9 by example.

The shroud housing 20 of the present invention 10 is also provided with an electrical resistance heating element means 60, which, in a preferred embodiment of the invention, is mounted within the inner wiper blade guide channel 46 of the housing 20, adjacent to the respective inside surfaces, 34a and 36a, of the respective first and second lateral sections 34 and 36, respectively, of the longitudinally oriented roof portion 22 of the shroud housing 20, as illustrated in part by example in the drawing illustrations of FIGS. 2, 3, 4, 6, 7, 8 and 9. The heating element means 60, which can be any of a diverse number of such electrical resistance elements and coiled wire means utilized for heating purposes, is logistically or positionally placed within the shroud, as described and illustrated, to provide radiating heat, when activated by conventional electrical power means typically provided in a motorized vehicle as illustrated in chart or diagrammatic form in FIG. 6, to an adjacently installed conventional wiper blade and frame 14; which is, in installed position in the shroud 20 positioned adjacent to and below the heating element means 60 within each respective lateral section, 34 and 36, respectively, as illustrated. In this manner, the applied radiating heat supplied from this position inside the shroud 20, relative to the secured position in the shroud of the installed wiper blade and frame assembly 14, prevents the moveable joists of the frame of the wiper blade assembly 14 from freezing solid, thus allowing the wiper blade to flex as it moves, to better conform to the contour and curvature typically characteristic of a vehicle windshield (not separately illustrated).

The shroud housing 20, in a preferred embodiment of the invention, is provided in a bowed or somewhat concave longitudinal configuration, as illustrated in FIGS. 13, 14, 15 and 16.

Additionally, in a preferred embodiment, the inner wiper blade guide channel 46 in cross-sectional areas adjacent to the respective end wall portions 28 and 30 of the respective first and second lateral sections, 34 and 36 respectively, have the general configuration of a parabolic cylinder, as illustrated in FIGS. 4, 11, 12, 13, 14, 15, 16, 17 and 21.

The inner channel 46, in one preferred embodiment of the invention 10 in relation to the heating element means 60 is covered or provided with at least one layer of a diverse available number of heating insulation material 62. Also, in another related preferred embodiment, the insulation material 62 can be applied as a coating to the outside or inside surface portions of the shroud housing 20, to assist in retaining heat energy generated by an activated, heating element means 60, as illustrated in part in FIG. 4.

Figure 4:
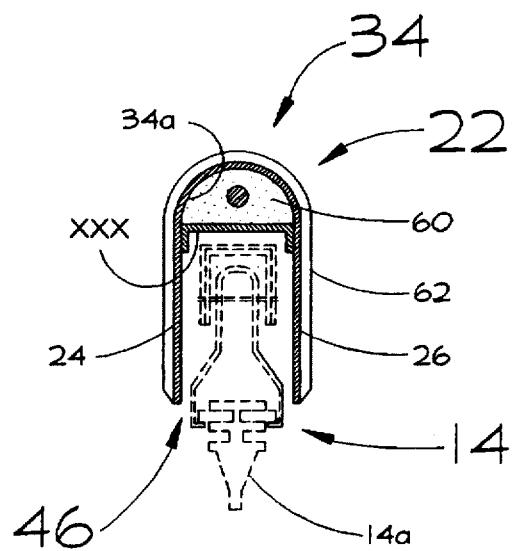
FIG. 4 is an end, cross-sectional view taken along a vertical axis of a lateral section of the roof portion of a preferred embodiment of the invention, illustrating in part the installation of a conventional motorized vehicle wiper blade and frame assembly.
Figure 5:
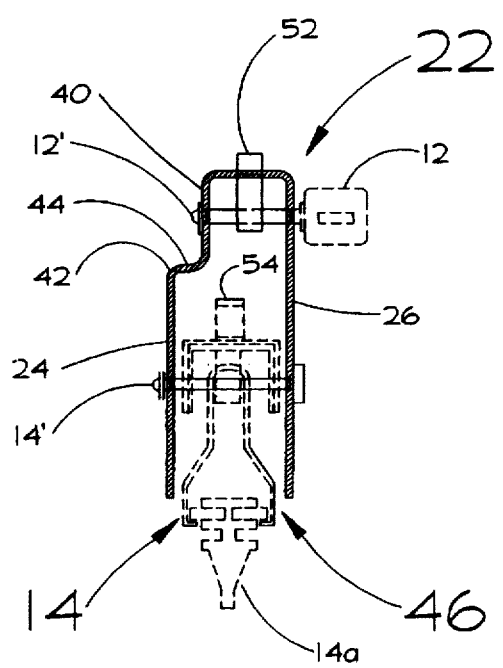
FIG. 5 is an end, cross-sectional view taken along the middle-section of the roof portion of a preferred embodiment of the present invention, illustrating in part the installation and attachment of a conventional vehicle windshield wiper arm, blade and frame assembly.
Figure 6:
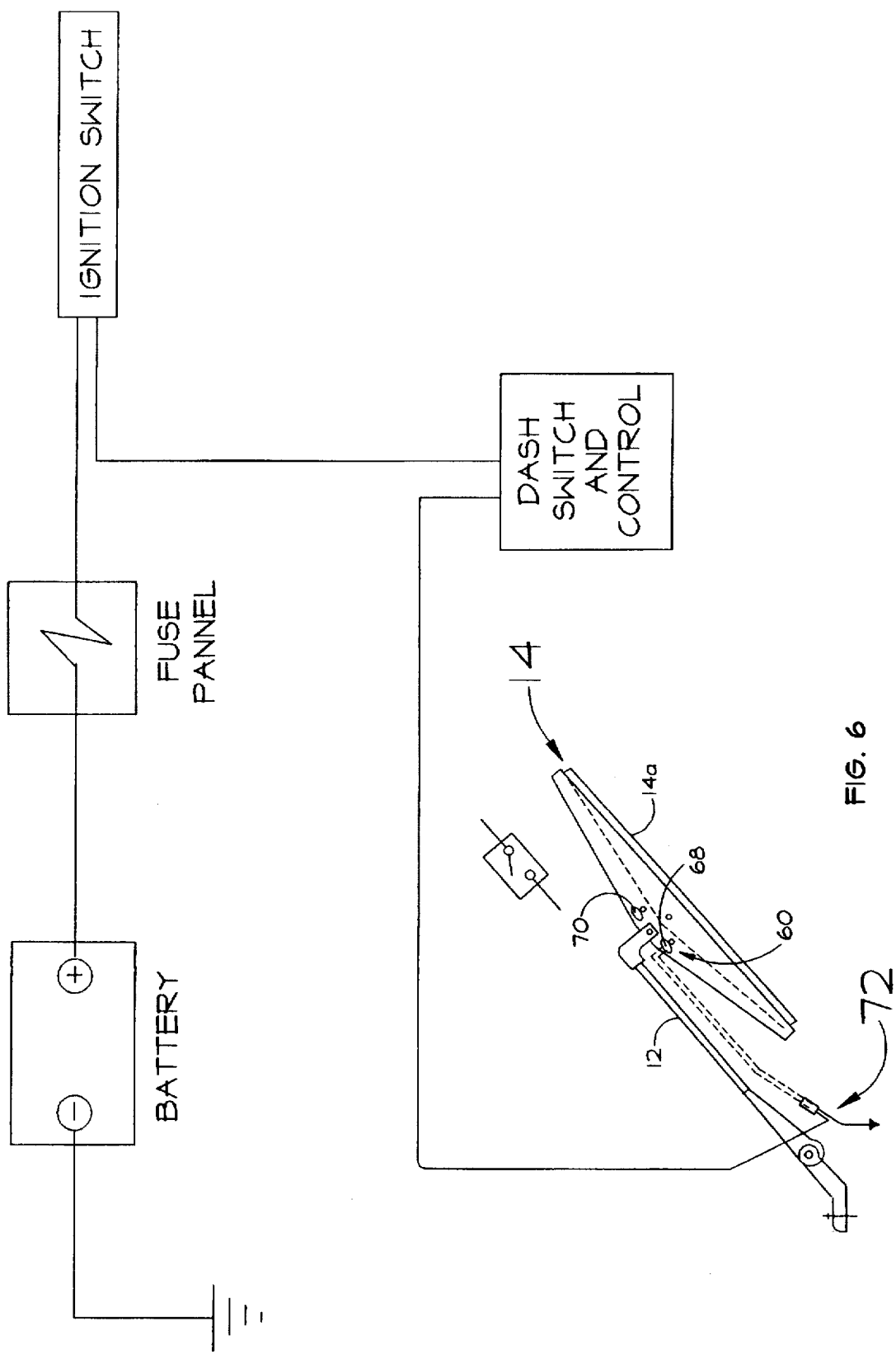
FIG. 6 is in part a block diagram illustrating the electrical interface of a preferred embodiment of the present invention with one of many conventional electrical systems available in a motorized vehicle, and in part the orientation of an electrical element positioning in a preferred embodiment of the invention.

Additionally, as discussed in part above, the electrical resistance heating element means 60 is provided in the teaching of the present invention as preferably comprising a first resistor heating element 64 installed and mounted with epoxy, adhesive glass or other suitable attaching and insulating material under and adjacent to the first lateral section 34, and a second resistor heating element 66 installed under and adjacent to the second lateral section 36 of the shroud housing 20; as illustrated in FIGS. 2, 7, 8, and 9. Each of the respective ends of the first heating element 64 and the second heating element 66, respectively, closest to the middle section 32 of the shroud 20, is each respectively provided with a first overheat protection thermostat member 68 attached and connected to element 64, and a second overheat protection thermostat member 70 attached and connected to element 66; as illustrated by example in FIGS. 6 and 8. Preferably, the heating element means 60 is activated by electrical activation wiring means 72 connected through the middle section 32 of the shroud 20 to a conventional vehicle electric battery power system for electrical activation of the means 60; as illustrated by example in FIGS. 1, 2, 6, 7, 8, 14 and 15. The wiring means 72 in a preferred embodiment is connected to a vehicle electric power and wiring system through an electrical male/female coupling connector, a part of the wiring means 72, as illustrated in diagrammatic form in FIG. 6. Additionally, in this regard, a rheostat member not separately illustrated is made a part of a dash switch and control system, as illustrated in part diagrammatically in FIG. 6, for controlling electrical voltage being supplied to the wiring means 72 and shroud housing 20. Additionally, FIG. 4 illustrates a heating means retaining shield member 130 which is shown by example in a preferred embodiment of the invention mounted laterally in support and protection of the heating element means 60.

Figure 9:
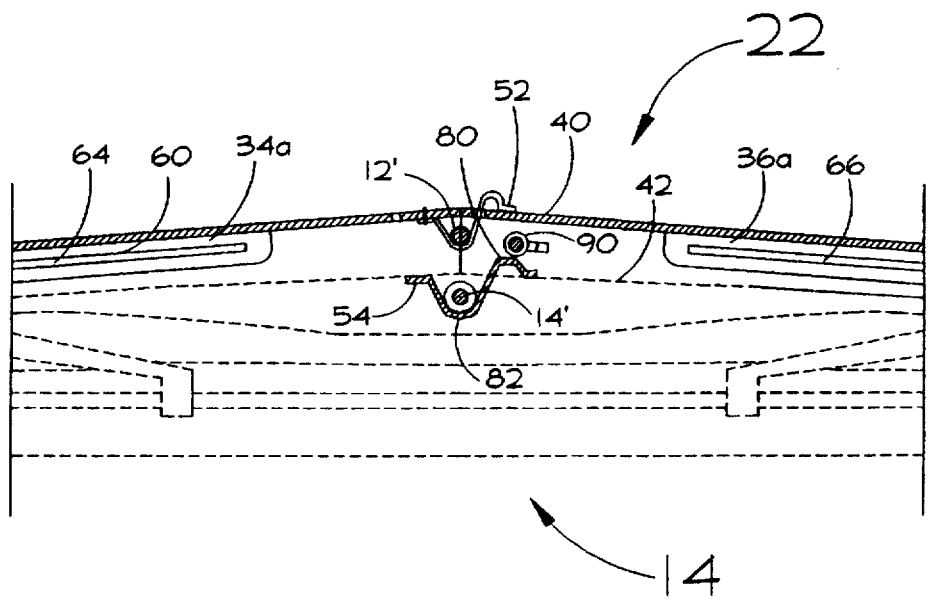
FIG. 9 is a partial cross-sectional view taken along the longitudinal axis, and area adjacent to the middle and lateral sections of the roof portion of a preferred embodiment of the invention, illustrating in part the installation and attachment of a conventional wiper blade and frame assembly.

As indicated earlier, the shroud housing 20 of the present invention 10, is further preferably provided with a first biasable clip member 52 and a second biasable clip member 54, as illustrated in FIGS. 2, 3, 5, 9, 11 and 15. In a preferred embodiment, each respective clip, 52 and 54, is provided as an s-shaped, or sinusoidally shaped, spring-clip, each having a first parabola-shaped portion 80 and a second parabola-shaped portion 82, as illustrated in FIGS. 2 and 9.

The middle section 32 of the shroud 20 is further provided with a clip compressing tool opening 90, as illustrated, by example, in FIGS. 7, 8, 9, 10, 13, 14, 16, 18, 19, 20 and 21. The tool opening 90 is positioned in the housing 20 close to, or adjacent to, the second pin-channel 50 for preferred engagement of an offset key member 92, illustrated in partial diagrammatic form in FIG. 10. In this manner, the key member 92 is inserted into the clip compressing tool opening 90 of the shroud 20 and turned to compress with the offset portion 94 of the key 92, the first parabola shaped portion 80 of the second biasable clip 54, to release the biasing pressure of the clip 54, to thereby release wiper blade connection pin 14$^1$ holding, in attached position, the wiper blade and frame assembly 14 to release the assembly 14 so that it can be removed from the wiper blade guide channel 46 of the internal portion of the shroud 20.

Figure 10:
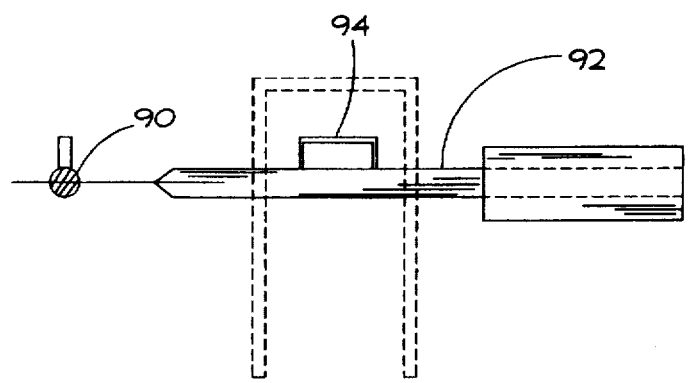
FIG. 10 is an enlarged side and front view, respectively of an offset key member and a clip compressing tool opening, utilized as a part of a preferred embodiment of the invention, presented in a partial diagrammatic form.
Figure 11:
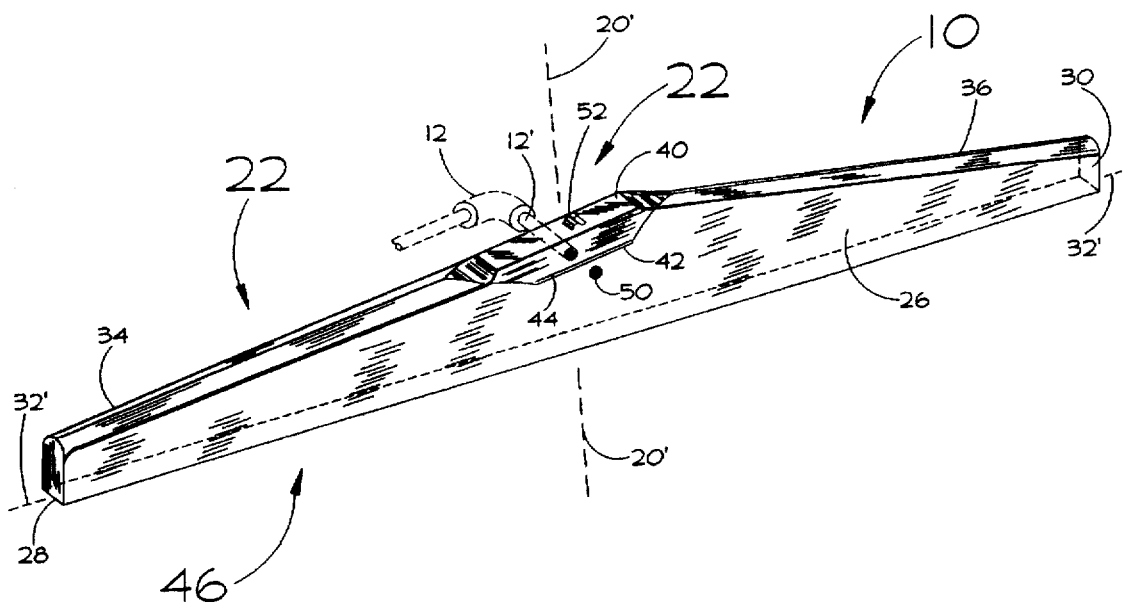
FIG. 11 is an elevated side end perspective view of a preferred embodiment of the invention, illustrating in part the installation of a conventional vehicle wiper arm.
Figure 12:
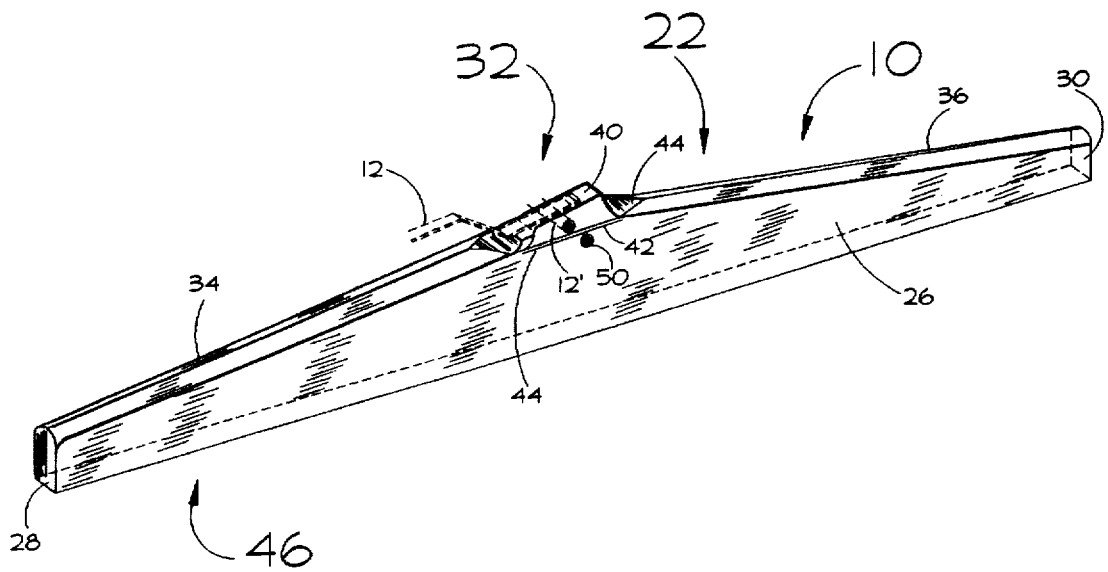
FIG. 12 is an elevated side end perspective of another preferred embodiment of the invention, illustrating in part the installation of another conventional windshield wiper arm.
Figure 13:
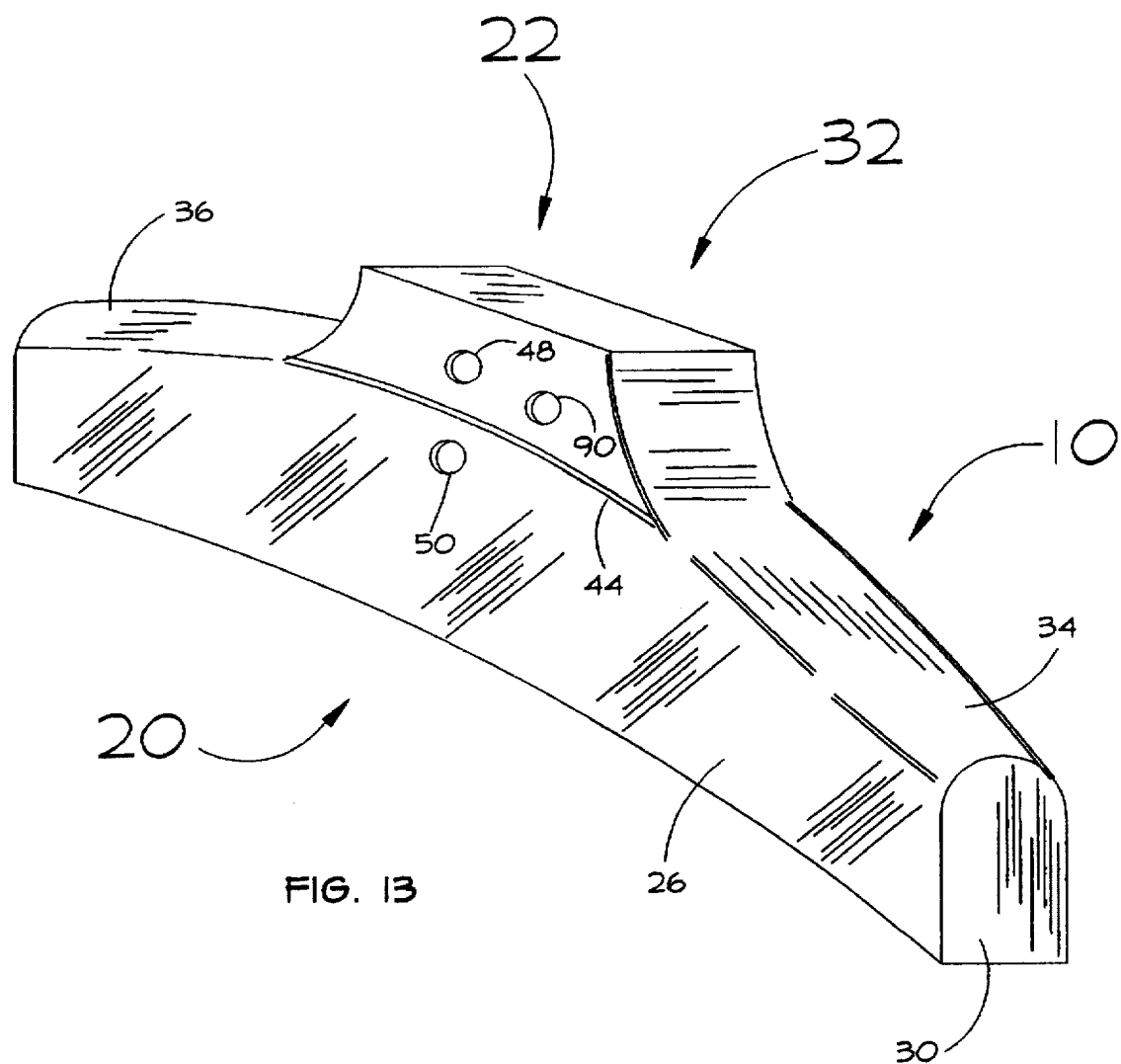
FIG. 13 is an enlarged elevated side end perspective view of the shroud housing of a preferred embodiment of the present invention.

The key member 92 can be provided as a small metal screwdriver-type device with a small plastic handle as illustrated in FIG. 10, or in many other configurations and construction materials. Additionally the tool opening 90, as well as the pin channels 48 and 50 of the shroud 20, when not in use or otherwise engaged, can be provided with removable plugs (not shown in drawings).

In a preferred embodiment the heating element means 60 is positioned and secured longitudinally in each respective lateral section 34 and 36 of the shroud 20 so that it is supported vertically in position for operation in the shroud 20, adjacent to and above in spaced position to the anticipated position, and attachment within the shroud 20 of the wiper blade 14, as illustrated in FIGS. 1, 3, 4 and 9.

Figure 7:
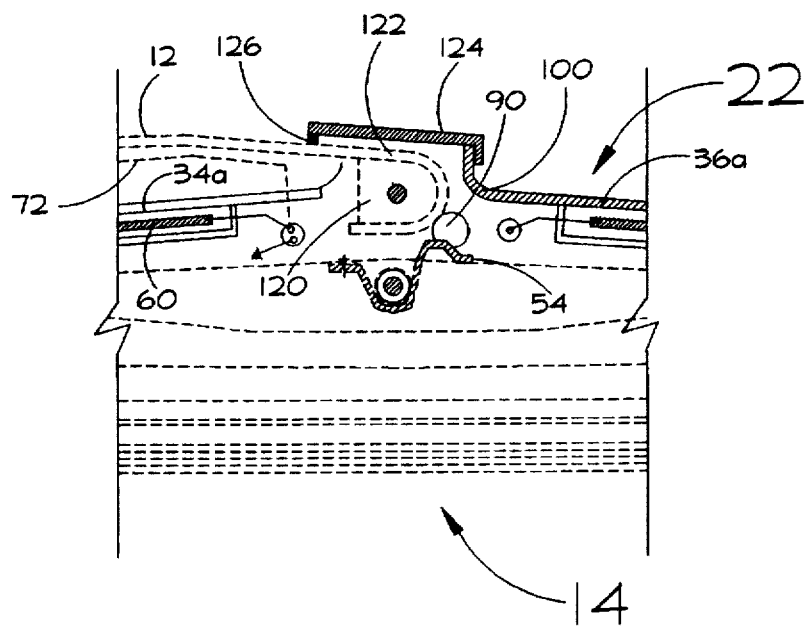
FIG. 7 is a partial cross-sectional view taken along the longitudinal axis, and area adjacent to the middle section, of another preferred embodiment of the present invention, illustrating in part the installation and attachment of another conventionally provided windshield wiper arm member and wiper blade and frame assembly, in combination with which the present invention is utilized.
Figure 8:
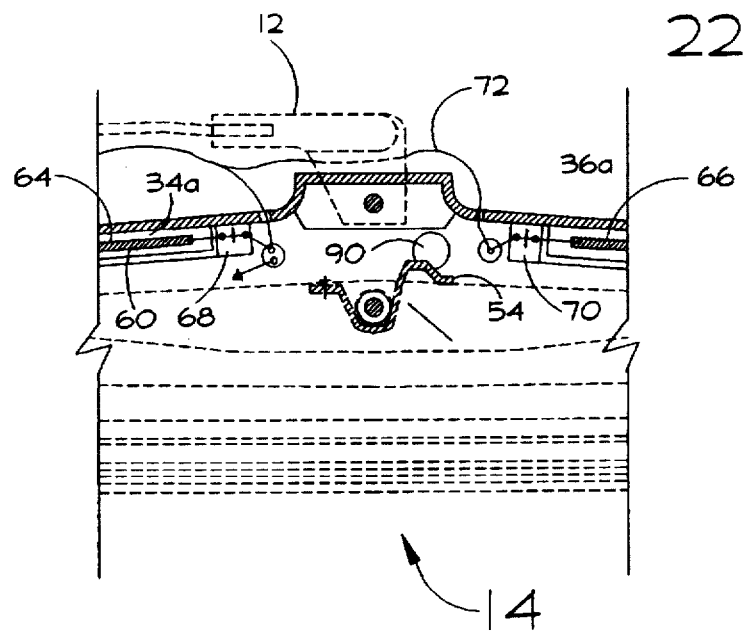
FIG. 8 is a partial cross-sectional view taken along the longitudinal axis, and area adjacent to the middle section of another preferred embodiment of the present invention, illustrating in part the installation of another type of conventionally available wiper arm and wiper blade/frame assemblies.
Figure 14:
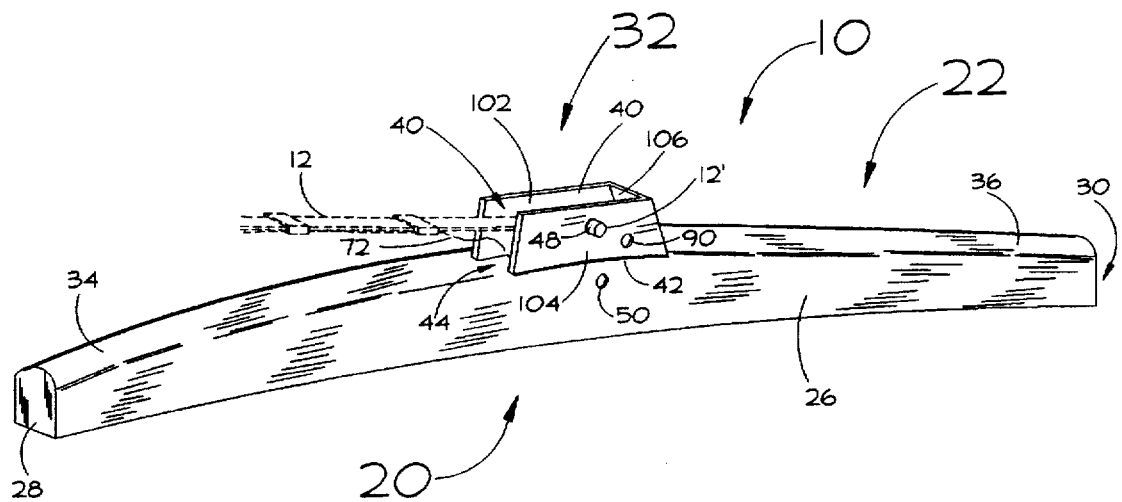
FIG. 14 is an elevated side end perspective of another preferred embodiment of the invention, illustrating in part the installation of another conventional vehicle windshield wiper arm.
Figure 15:
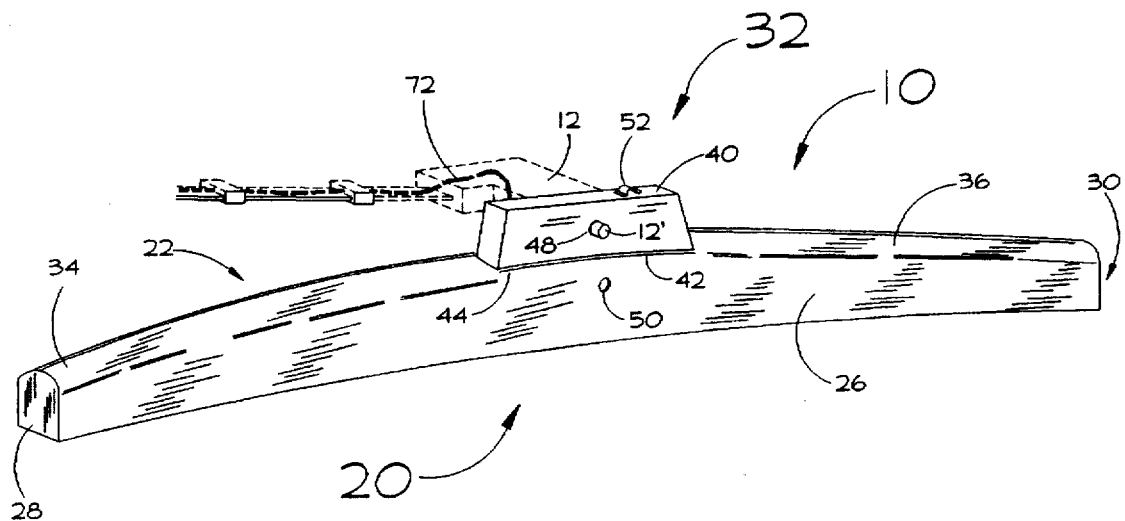
FIG. 15 is an elevated side end perspective of another preferred embodiment of the invention, illustrating in part the installation of another conventional vehicle windshield wiper arm.
Figure 16:
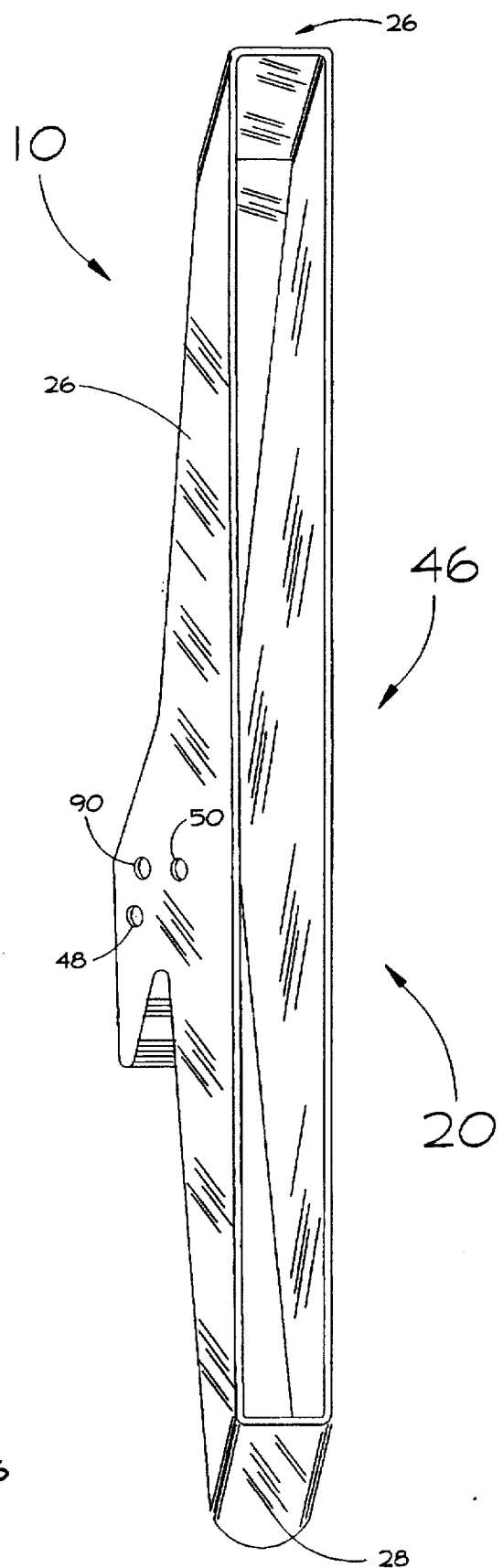
FIG. 16 is a bottom side end perspective of the shroud housing of a preferred embodiment of the invention.
Figure 17:
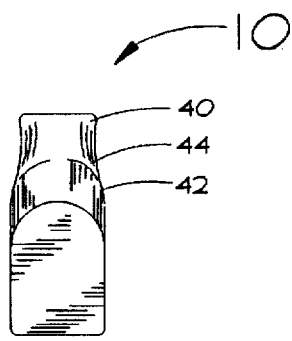
FIG. 17 is an end view of the shroud housing of a preferred embodiment of the invention.
Figure 18:
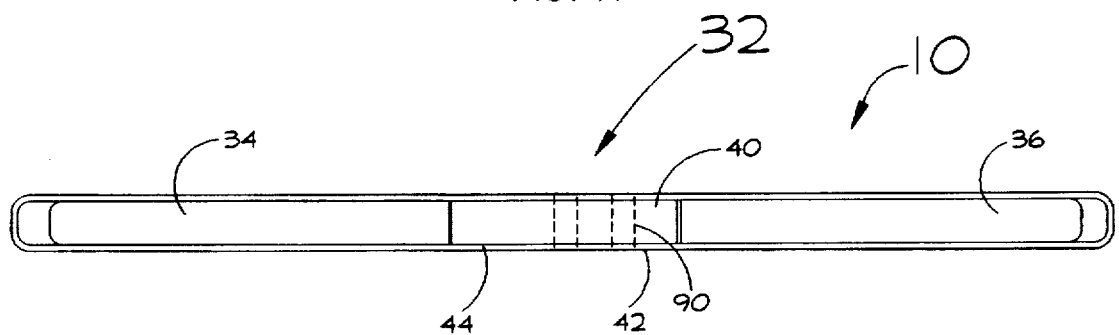
FIG. 18 is a bottom view of the shroud housing of a preferred embodiment of the invention.
Figure 19:
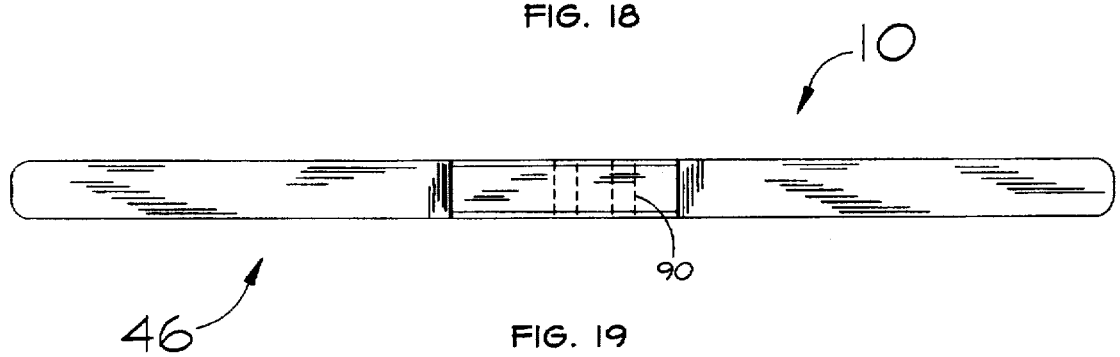
FIG. 19 is a top view of the shroud housing of a preferred embodiment of the invention.
Figure 20:
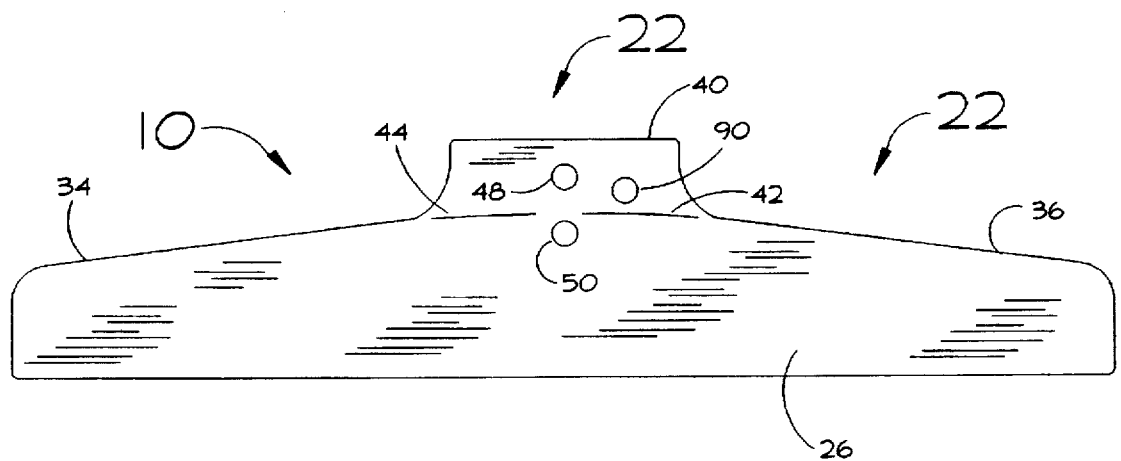
FIG. 20 is a side view of the shroud housing of a preferred embodiment of the invention.
Figure 21:
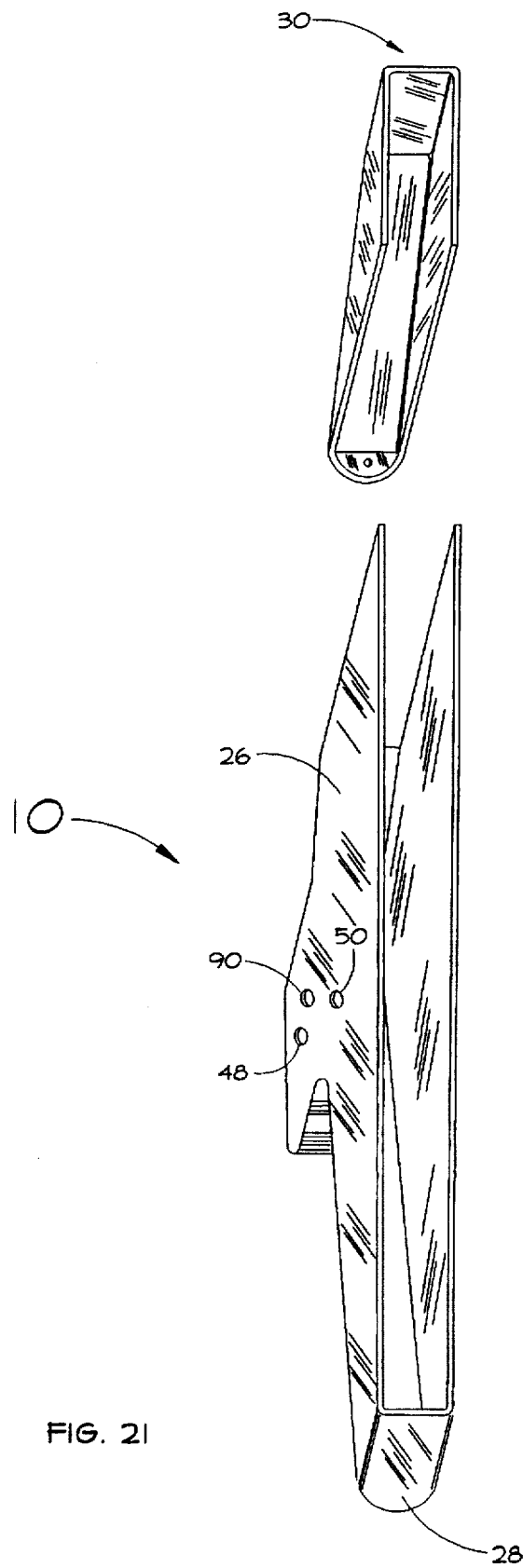
FIG. 21 is a bottom side end partially exploded perspective view of the shroud housing of a preferred embodiment of the invention, illustrating fitted portions of the present invention.

In another preferred embodiment of the invention the first vertically disposed upper width 40 and shelf portion 44 is structured and defined in accordance with the teaching of the present invention within the walls of a rectangular wall member 100, as illustrated in part in FIG. 7, and more fully illustrated in FIG. 14. In one preferred embodiment the wall member 100 is provided with first and second walls, 102 and 104, generally parallel to one another, and a third end wall 106, as illustrated in FIG. 14.

In an additional preferred embodiment of the invention the upper width 40 of the middle section 32 is provided with a curved attachment member 120, for receipt and installation in certain cases in the conventional prior art when the end portion attachment area of the wiper arm 12 is provided, with the vehicle, having a curved attachment end-piece 122, as illustrated in FIG. 7. Additionally, in a related preferred embodiment, the wall member 100 is provided with a snap-on, or spring-loaded snap-on cover member 124, for seating and support on top or above the rectangular wall member 100, as illustrated in FIG. 7, to assist in keeping air from entering the shroud 20 in this embodiment. In the embodiment illustrated in FIG. 7, a spring biased member 126 is illustrated in this example as being utilized with the cover member 124. It will be understood that a number types of biased or snap-on covers can be employed at this position of this embodiment of the shroud 20 to prevent air from entering.

Additionally, the prior art envelope or cover members have been constructed of flexible, elastic and/or rubber-like materials such as the material utilized to construct conventional wiper blades. However, the present invention utilizes construction materials in manufacturing or fabricating the shroud housing 20 of the present shroud system 10 which are preferably solid and resilient in character such as metal, aluminum, other metal alloy, harder temperature resistant polymer or composite materials, or substantially harder, though malleable, polymer; and/or plastic, wood, glass composite or metal materials; so that the shroud housing 20 is substantially solid, resilient and not appreciably elastic, in character. Additionally, it will be understood that the shroud housing 20 can be constructed in attachable parts or in one-piece integral construction, as illustrated in part by example in FIGS. 13, 16 and 21. In so doing the external and/or internal surfaces of parts, sections and portions of the housing 20 can be coated with one or more layers of insulating material 62, illustrated generally by example in FIG. 4, to protect against heat loss. When utilized in this manner, in a preferred embodiment, on external surfaces of the shroud housing 20, the color of the external insulation material can be used to add color and design characteristics to the appearance of the shroud 20.

Also, the electrical resistance heating element means 60 can be supported and shielded in its mounted position in the inner channel 46, adjacent to the insider surfaces of the respective lateral sections 34 and 36; 34a and 36a, by a glass, polymer, composite, metal or alloy heating means retaining shield member 130, as illustrated by example in FIG. 4.

Figure 22:
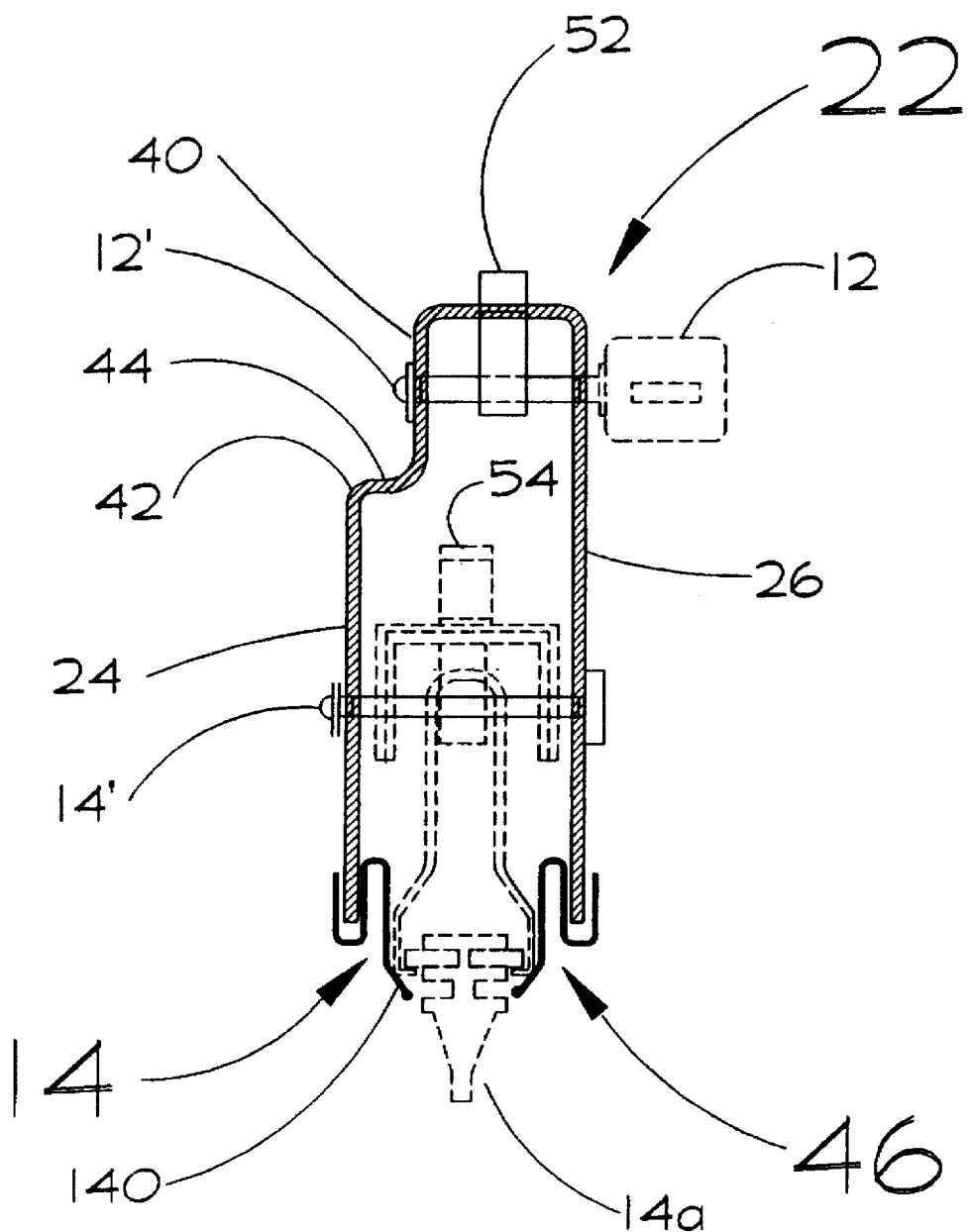
FIG. 22 is an end, cross sectional view taken vertically along the middle section of the roof portion of another preferred embodiment of the present invention, illustrating the installation and attachment of a conventional vehicle windshield wiper arm, blade and frame assembly, with which the present invention is used in combination.
Figure 23:
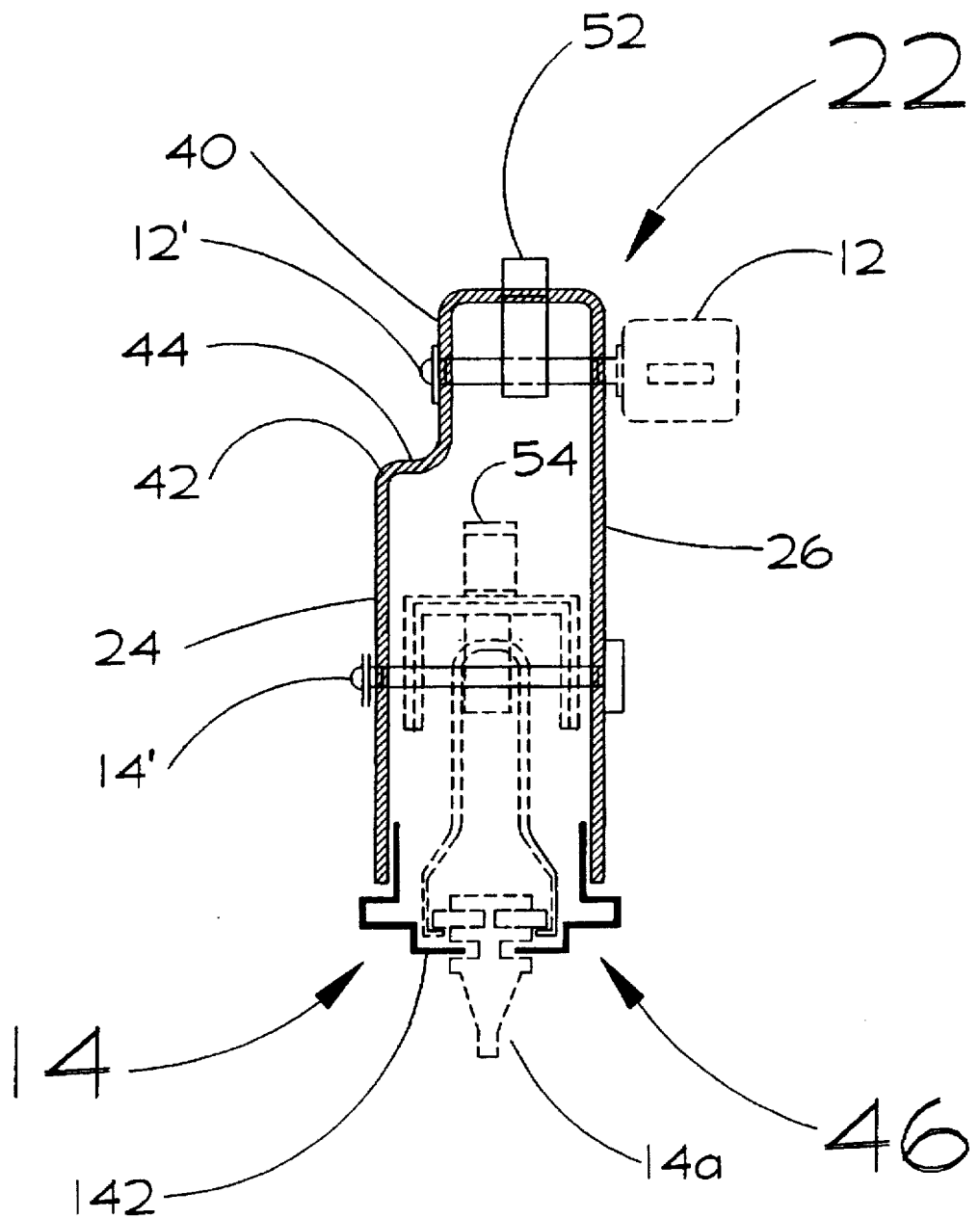
FIG. 23 is an end, cross sectional view taken vertically along the middle section of the roof portion of another preferred embodiment of the present invention, illustrating, in part the installation and attachment of a conventional vehicle windshield wiper arm, blade and frame assembly.
Figure 24:
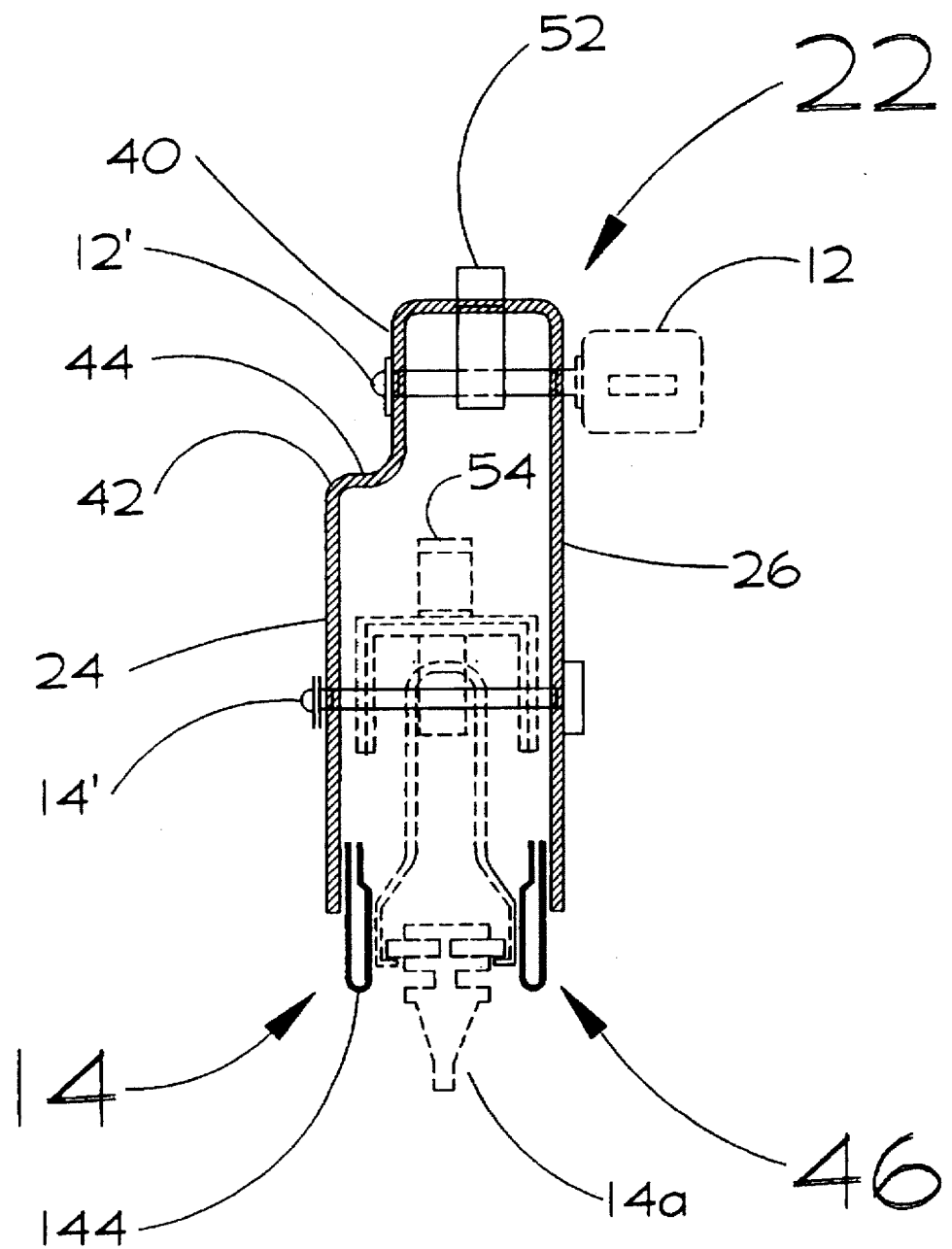
FIG. 24 is an end, cross-sectional view taken along the middle section of the roof portion of yet another preferred embodiment of the present invention, illustrating, in part, the invention's use in novel combination with a conventional or prior art vehicle windshield wiper system.

In another preferred embodiment of the present invention 10, the shroud housing 20 is provided along its inner wiper blade guide channel 46 with a first flexible closure member 140, as illustrated in FIG. 22. A second embodiment of the invention's closure member is illustrated as a second flexible closure member 142, as illustrated in FIG. 23; and a third embodiment of the invention's closure member is illustrated as a third flexible closure member 144, as illustrated in FIG. 24. In each case, it is a teaching of the present invention, that the closure member, 140, 142, 144 (its embodiments), be utilized as a part of the invention, by securely attaching the closure member within the inner wiper blade guide channel 46 of the shroud 20, so that it extends outside of the channel 46, along the entire longitudinal length of the shroud housing 20, to biasably interface with the projected position of a conventional wiper blade member 14a when in installed and operational position within the shroud 20. In this manner, each embodiment of the closure member, 140, 142, 144, is designed as a part of the present invention to provide a biasable seal or containment of the heat energy that might otherwise escape from spatial areas adjacent to the channel 46 of the shroud 20 and an installed wiper blade 14a, of a conventional wiper blade and frame assembly 14, installed within the guide channel 46 of the shroud 20.

Additionally, in preferred embodiments of the invention, the first, second and third flexible closure members 140, 142, and/ or 144, respectively, is fixedly secured to the shroud housing 20 so that each is mounted generally proximate to the inner wiper blade guide channel 46 of the shroud housing 20; in this manner, each respective closure member is positioned, constructed, designed and installed to extend along the general vertical axis spacing relative to the shroud 20 and outside or outboard of the inner channel 46 of the shroud 20; so that each closure member, 140, 142 and/or 144, respectively, is constructed and positioned to touch, position itself with or interface with the side or other portion of an installed conventional wiper blade and frame assembly 14 secured and installed inside the inner channel 46 of the shroud 20; for flexibly guiding, sealing and supporting a conventional blade member 14a installed in the invention, while it is mounted in the shroud 20 of the invention, and moving and operating along the windshield of a vehicle on which the invention is installed, and for helping to seal and biasably and flexibly insulate against the loss of radiating heat energy produced by an electrically activated and functioning heating element means 60 within the shroud housing 20 of the invention, which would otherwise possibly escape through spacial openings between the perimeters of the inner channel 46 and portions of an installed wiper assembly 14 installed in the shroud 20 of the invention 10.

Each of the closure members disclosed and described herein as examples of the teaching of the invention 10, flexible closure members 140, 142 and 144, and other constructed and mounted closure members consistent in design, construction and purpose with the scope, purpose and spirit of the present invention, as described, illustrated and claimed; is constructed of a biasable, flexible and resilient, heat-sealing constructive material; including, but not limited to, such constructive materials such as softer rubber, polymer or flexible composite materials. Additionally, in preferred embodiments of the invention, the closure members 140, 142 and 144, or consistent embodiments thereof, are each mounted at least partially within the inner guide channel 46 of the shroud 20, and spatially brought to extend outboard or vertically outside of the inner channel 46, and each is mounted and positioned to touch, or proximally be positioned beside or adjacent to, a side portion of a wiper blade member 14a and/or pivotable wiper support frame 14b of a wiper blade and frame assembly mounted in operational position within the channel 46 of the shroud 20; as illustrated in FIGS. 22, 23 and 24.

Additionally, in a preferred embodiment of the present invention, the first flexible closure member 140, illustrated in FIG. 22, is composed of at least first and second portions, mounted, respectively, on the free end portions of the first longitudinal wall portion 24 and the second longitudinal wall portion 26, and the free end portions of the first width oriented end wall portion 28 and the second width oriented end wall portion 30, as illustrated. In this embodiment, the free unsecured, biasable end-portion of each of the portions of the closure member 140 are designed in configuration to extend vertically outboard of the guide channel 46 and rest positionally, and interface, along the perimeter of side portions of an installed wiper blade assembly 14, so that the closure member can bias and flex with the operational positional movement of a wiper blade member 14a, and seal and insulate against heat loss adjacent to an operational wiper assembly 14 in the shroud 20. Within the scope of the same teaching of the present invention, another similar embodiment of the invention, the third flexible closure member 144 is illustrated in FIG. 24.

Additionally, in a preferred embodiment of the present invention, the second flexible closure member 142 is illustrated in FIG. 23. The flexible closure member 142 is comprised of a least two portions which each, respectively, extend from and are mounted and secured to the inside surface of the first longitudinal wall portion 24 and the second longitudinal wall portion 26, respectively; with each portion of the closure 142 extending from its mounted positional end within the inner guide channel 46 from the inside surface of each respective longitudinal wall, 24 and 26. In this preferred embodiment, a preferable configuration of each portion of the second closure member 142 is employed where the outboard extended parts of each portion of the closure 142 is configured in perimeter to have at least five (5) transverse sides and to form a transversely oriented, step-construction platform, with each of the two portions of the closure member 142, respectively, having a free end which extends proximately transverse to the mounted vertical axis of a side portion of a wiper blade member 14a, as illustrated in FIG. 23. By employing this configuration of each portion of the closure 142 of the present invention, each free end of each of the portions of the closure 142, extends into a channeled portion of a positioned and operatively installed wiper 14 to provide biasably, flexible and spring-like support of the wiper as it may bend in operation along a windshield, and excellent sealing and flexible insulation from heat loss and escape from inside the shroud 20.

While the present invention has been described in connection with the particular embodiments thereof, it will be understood that many changes and modifications of this invention may be made by those skilled in the art without departing from the true spirit, concepts and scope of the present invention. Accordingly, the appended claims are intended to cover all such changes and modifications as falling within the true scope and spirit of the present invention. The reader is requested to determine the scope of the invention by the appended claims and their legal equivalents, and not by the examples which have been given.

Having described my invention, I claim:

1. A heated windshield wiper shroud system for use in combination with a windshield wiper arm assembly, a flexibly arcable wiper blade assembly, a pivotable wiper frame assembly, and a windshield having outside and inside surfaces; the windshield wiper arm assembly being electrically activated and pivoted in relation to the outside surface of the windshield, and having at one end thereof a pin means for providing a wiperarm pin member having a length in substantially parallel relation to the outside surface of the windshield; and the wiper blade assembly and wiper frame assembly each having at least a length component and a transverse width component, the transverse width component of the wiper frame assembly defining a pin connection channel which, when positioned lengthwise for installment, is substantially parallel to the outside surface of the windshield; the length component of the wiper blade and frame assemblies each having a middle portion and first and second lateral portions on either side thereof; said heated windshield wiper shroud system comprising:

a open-ended shroud housing having a longitudinally oriented roof portion, a pair of opposing longitudinally positioned wall portions and a pair of opposing transversely positioned endwall portions; defining an arcuate open end opposite of said roof portions;

said roof portion having a middle section and adjoining first and second lateral sections, extending longitudinally on either side thereof;

said middle section having and defining a first transversely and vertically disposed upper width and a second, differentially dimensioned, transversely and vertically disposed lower width such that a shelf portion is defined transversely of a vertical axis of the lower width, the first and second lateral sections being concurrent and coextensive with, and between, the upper width of the middle section and each of the respective end wall portions;

said shroud housing defining a first inner pin-channel extending substantially transversely of a common vertical axis of the upper width of said middle section and the open end, for receipt and installation of the pin means for providing a wiperarm pin member, the first inner pin-channel being oriented lengthwise in a parallel positional relation to the outside surface of the windshield when the shroud housing is in position for receipt and installation of the pin means;

said shroud housing further having and defining a second inner pin-channel, extending substantially transversely of a vertical axis of the lower width, and substantially parallel with the first inner pin-channel, for alignment, during installation of the wiper frame assembly, with the pin connection channel of the transverse width component of the wiper frame assembly;

said shroud housing having and defining an inner installation channel operatively coextensive through the first upper width, the second lower width, the lateral sections, wall portions, endwall portions and open end, and through which the first and second inner pin-channels pass, and by, and within, which the wiper blade and wiper frame assemblies are movably and releasably channeled and flexibly and pivotally connected; and means for providing electrical direct radiating heating fixedly mounted within the inner installation channel on the first and second lateral sections of said roof portion and adjacent portions of said pair of opposing longitudinally positioned wall portions, such that a direct radiating heat source is provided above and adjacent to the first and second lateral portions of the pivotable wiper frame assembly when the wiper frame assembly is movably and releasably channeled and flexibly and pivotably connected within said open-ended shroud housing.

2. The heated windshield wiper shroud system of claim 1, wherein:

the middle section further comprises:

a generally rectangular wall structure having first and second parallel walls, each of which is generally trapezoidal in configuration when viewed along a vertical axis of the middle section, and a third endwall, the parallel walls and endwall, each having first and second widthside portions and inside and outside surfaces, each of the first width side portions of each wall being fixedly attached to the adjoining first and second lateral sections of said roof portion, and each of the second widthside portions being a free end, such that the inside surfaces of the parallel walls define the first transversely and vertically disposed upper width and the shelf portion defined transversely of a vertical axis of the lower width, and the outside surfaces of the parallel walls substantially define the second, differentially dimensioned, transversely and vertically disposed lower width.

3. The heated windshield wiper shroud system of claim 1, wherein:

said shroud system further comprises:

a first biasable clip member, said first clip member being substantially sinusoidally shaded and constructed having an upper curve element and a lower curve element, and being fixedly mounted on said shroud housing in biasable communicating adjacent interface with said first inner pin-channel for biasably and releasably engaging, at its lower curve element thereof, the pin means for providing wiperarm pin member, when the pin means is attached to said shroud housing.

4. The heated windshield wiper shroud system of claim 3, wherein:

said shroud system further comprises:

a second biasable clip member, said second clip member being substantially sinusoidally shaped and constructed, having an upper curve element and a biasing lower curve element, and being fixedly mounted on said shroud housing in biasable, communicating, adjacent interface with said second inner pin-channel, being in biasable alignment, at its lower curve element thereof, with the pin connection channel of the transverse width component of the wiper frame assembly when the assembly is placed in position to be channeled and connected within said shroud housing.

5. The heated windshield wiper shroud system of claim 4, wherein:

said shroud system further comprises:

a blade connection pin, said pin being slideably and releasably installed, when the wiper frame assembly is in installable position, such that said blade connection pin communicates in substantial alignment with the second inner pin-channel of said shroud housing, the pin connection channel of the wiper frame assembly and the biasing lower curve element of the second biasable clip member.

6. The heated windshield wiper shroud system of claim 5, wherein:

said first upper width is dimensioned from about 0.5 inches to about 1.0 inches, or from about 12.7 mm. to about 25.4 mm., and said second lower width is dimensioned from about 0.5 inches to about 1.25 inches, or about 12.7 mm. to about 31.75 mm.; said second lower width being differentially dimensioned from said first upper width.

7. The heated windshield wiper shroud system of claim 5, wherein:

said shroud system is vertically bowed in configuration along the opposing longitudinally positioned wall portions and the pair of opposing transversely positioned endwalls portions of the shroud housing of said shroud system.

8. The heated windshield wiper shroud system of claim 5, wherein:

the inner installation channel of said shroud housing is covered with at least one layer of electrical insulation material; and wherein:

said means for providing electrical direct radiating heating comprises first and second resistor heating elements, each having first and second ends, the first end of each respective heating element having an overheat protection thermostat member, each of said respective thermostat members being connected and interfaced through the middle section of the roof portion of said shroud housing with a means of electrical activation.

9. The heated windshield wiper shroud system of claim 5, wherein:

the middle section of said roof portion further defines a clip compressing tool opening generally adjacent to the second inner pin-channel;

and wherein said shroud system further comprises:

an offset key member having an offset portion, said key member being insertable into said clip compressing tool opening such that the offset portion communicates with and compresses the upper curve element of said second biasable clip member, thereby moving the biasing lower curve element of the second clip member from its alignment with the blade connection pin, so that the pin is releasably withdrawable from the second inner pin-channel of the shroud housing and the pin connection channel of the wiper frame assembly, and the wiper frame assembly and wiper blade assembly are withdrawable from the inner installation channel of said shroud housing.

10. The heated windshield wiper shroud system of claim 5, wherein, the shroud system further comprises a flexible closure member, said closure member being fixedly secured to said shroud housing, mounted proximate to the open end of the shroud housing, such that it may remain operatively flexible with the wiper blade assembly when the blade assembly is separately channeled and connected with the shroud housing, and assist in insulation and preservation of heat while also permitting fluids to exit from within the inner installation channel and open end of the shroud housing, the closure member comprising a flexible wall constructed to extend, in its general vertical positional orientation, transverse to said roof portion, outside of the inner installation channel and open end of the shroud housing, such that it proximately interfaces positionally with the position of the wiper blade assembly when the wiper frame and wiper blade assemblies are movably and releasably channeled and flexibly and pivotably connected within the inner installation channel of said shroud housing.

11. The heated windshield wiper shroud system of claim 10, wherein:

the wall of said flexible closure member is constructed of flexible and resilient, partially heat-sealing, constructive material, and is operatively mounted at least partially within the inner installation channel of the shroud housing, such that it operatively extends outboard of the open end of the shroud housing to a position generally adjacent to the wiper blade assembly when the wiper frame and wiper blade assemblies are, separately, movably and releasably channeled and flexibly and pivotably connected within the inner installation channel of the shroud housing, so as to partially insulate against heat loss from within the shroud housing while permitting liquids and fluids to pass therethrough from out of the shroud housing.

12. The heated windshield wiper shroud system of claim 11, wherein:

the wall of the flexible closure member, extending outboard of the open end of the shroud housing, comprises a plurality of side members connected transversely to each other and having at least two free ends which extend proximate and adjacent, without touching, to the wiper blade assembly when the wiper frame and wiper blade assemblies are channeled and connected within the inner installation channel and not weight bearing upon the outside surface of the windshield.

13. The heated windshield wiper shroud system of claim 11, wherein:

the wall of the flexible closure member, extending outboard of the open end of the shroud housing is constructed in a substantially cantilevered configuration to rest generally proximate of the channeled and connected wiper blade assembly when not weight bearing upon the outside surface of the windshield.

14. A heated windshield wiper shroud system for use in combination with a windshield wiper arm assembly, a flexibly arcable wiper blade assembly, a pivotable wiper frame assembly, and a windshield having outside and inside surfaces; the windshield wiper arm assembly being electrically activated and pivoted in relation to the outside surface of the windshield, and having at one end thereof a coupable flange member, the flange member having first and second projecting members and defining a flange space therebetween, and each of the projecting members defining a couple channel, axial with one another, and having a couple pin which is inserted through each of the couple channels when the windshield wiper arm assembly is inserted and installed, and when in inserted and installed position the couple pin is substantially parallel to the outside surface of the windshield; and the wiper blade assembly and wiper frame assembly each having at least a length component and a transverse width component, the transverse width component of the wiper frame assembly defining a pin connection channel which, when positioned lengthwise for installment, is substantially parallel to the outside surface of the windshield, the length component of wiper blade and frame assemblies each having a middle portion and first and second lateral portions on either side thereof; said heated windshield wiper shroud system comprising:

a open-ended shroud housing having a longitudinally oriented roof portion, a pair of opposing longitudinally positioned wall portions and a pair of opposing transversely positioned endwall portions; defining an arcuate open end opposite of said roof portion;

said roof portion having a middle section and adjoining first and second lateral sections, extending longitudinally on either side thereof;

said middle section having and defining a first transversely and vertically disposed upper width and a second, differentially dimensioned, transversely and vertically disposed lower width such that a shelf portion is defined transversely of a vertical axis of the lower width, the first and second lateral sections being concurrent and coextensive with, and between, the upper width of the middle section and each of the respective end wall portions;

said shroud housing defining a first inner pin-channel extending substantially transversely of a common vertical axis of the upper width of said middle section and the open end of the shroud housing, for receipt and installation of the coupable flange member of the windshield wiper arm assembly, said coupable flange member being inserted and installed on the upper width of said middle section such that the flange space is positioned about the upper width and the couple channels are in substantial axial alignment with the first inner pin-channel, the couple pin being inserted to fixedly connect in axial alignment the couple channels and first inner pin-channel, when the windshield wiper arm assembly is positioned for installment on the shroud housing;

said shroud housing further having and defining a second inner pin-channel, extending substantially transversely of a vertical axis of the lower width, and substantially parallel with the first inner pin-channel, for alignment, during installation of the wiper frame assembly, with the pin connection channel of the transverse width component of the wiper frame assembly;

said shroud housing having and defining an inner installation channel coextensive through the first upper width, the second lower width and the wall portions through which the first and second inner pin-channels pass, and by, and within, which the wiper blade and wiper frame assemblies are movably and releasably channeled and flexibly and pivotably connected; and means for providing electrical direct radiating heating fixedly mounted within the inner installation channel on the first and second lateral sections of said roof portion and adjacent portions of said pair of opposing longitudinally positioned wall portions such that a direct radiating heat source is provided above and adjacent to the first and second lateral portions of the pivotable wiper frame assembly when the wiper frame assembly is movably and releasably channeled and flexibly and pivotably connected within said open-ended shroud housing.

15. The heated windshield wiper shroud system of claim 14, wherein:

said shroud system further comprises:

a biasable sinusoidal clip member, said clip member being substantially sinusoidally shaped and constructed, having an upper curve element and a biasing lower curve element, and being fixedly mounted on said shroud system in biasable, communicating, adjacent interface with said second inner pin-channel, being in biasable alignment, at its lower curve element thereof, with the pin connection channel of the transverse width component of the wiper frame assembly when the assembly is placed in position to be channeled and connected within said shroud housing;

a blade connection pin, said pin being slideably and releasably installed, when the wiper frame assembly is in installable position, such that said blade connection pin communicates in substantial alignment with the second inner pin-channel of said shroud housing, the pin connection channel of the wiper frame assembly and the biasing lower curve element of the biasable sinusoidal clip member; and the middle section of said roof portion further defines a clip compressing tool opening generally adjacent to the second inner pin-channel and the upper curve element of the biasable sinusoidal clip member;

and wherein said shroud system further comprises:

an offset key member having an offset portion, said key member being insertable into said clip compressing tool opening so that the offset portion of the key member communicates with and compresses the upper curve element of said biasable sinusoidal clip member, thereby moving the biasing lower curve element of the clip member from its alignment with the blade connection pin, so that the pin is releasably withdrawable from the second inner pin-channel of the shroud housing and the pin connection channel of the wiper frame assembly, and the wiper frame assembly and wiper blade assembly are withdrawable from the inner installation channel of said shroud housing.

16. The heated windshield wiper shroud system of claim 15, wherein:

the shroud system further comprises a flexible closure member, said closure member being fixedly secured to said shroud housing, mounted to operatively extend outboard of the open end of the shroud housing, such that it may remain flexible with the wiper blade assembly when the blade assembly is separately channeled and connected within the shroud housing, and assist in insulation and preservation of heat while also permitting fluids to exit from within the inner installation channel of the shroud housing.

17. A heated windshield wiper shroud system for use in combination with a windshield wiper arm assembly, a flexibly arcable wiper blade assembly, a pivotable wiper frame assembly, and a windshield having outside and inside surfaces; the windshield wiper arm assembly being electrically activated and pivoted in relation to the outside surface of the windshield, and having at one end thereof a curved attachment loop member, defining a looped space opening proximal to the outside surface of the windshield when in a installed position, and having a width component substantially parallel to the outside surface of the windshield when in a installed position; and the wiper blade assembly and wiper frame assembly each having at least a length component and a transverse width component, the transverse width component of the wiper frame assembly defining a pin connection channel which, when positioned lengthwise for installment, is substantially parallel to the outside surface of the windshield, the length component of the wiper blade and frame assemblies each having a middle portion and first and second lateral portions on either side thereof; said heated windshield wiper shroud system comprising:

a open-ended shroud housing having a longitudinally oriented roof portion, a pair of opposing longitudinally positioned wall portions and a pair of opposing transversely positioned endwall portions; defining an arcuate open end opposite of said roof portion;

said roof portion having a middle section and adjoining first and second lateral sections, extending longitudinally on either side thereof;

said middle section having and defining a first transversely and vertically disposed upper width and a second, differentially dimensioned, transversely and vertically disposed lower width such that a shelf portion is defined transversely of a vertical axis of the lower width, the first and second lateral sections being concurrent and coextensive with, and between, the upper width of the middle section and each of the respective endwall portions;

said upper width having curved attachment means for securely and releasably installing the curved attachment loop member of the windshield wiper arm assembly and a biasable cover member releasably installed on and above the curved attachment means when the curved attachment loop member is in a installed position;

said shroud housing further having and defining an inner pin-channel, extending substantially transversely of a common vertical axis of the lower width of said middle section and the open end of the shroud housing, and generally centered and parallel with said curved attachment means, for alignment, during installation of the wiper frame assembly with the pin connection channel of the transverse width component of the wiper frame assembly;

said shroud housing having and defining an inner installation channel coextensive through the first upper width, the second lower width and the wall and endwall portions, through which the inner pin-channel passes, and by, and within, which the wiper blade and wiper frame assemblies are movably and reasonably channeled and flexibly and pivotably connected;

means for providing electrical direct radiating heating fixedly mounted within the inner installation channel on the first and second lateral sections of said roof portion and adjacent portions of said pair of opposing longitudinally positioned wall portions such that direct radiating heat source is provided above and adjacent to the first and second lateral portions of the pivotable wiper frame assembly when the wiper frame assembly is movably and releasably channeled and flexibly and pivotably connected and installed with said open-ended shroud housing;

a biasable sinusoidal clip member, said clip member being substantially sinusoidally shaped and constructed, having an upper curve element and a lower curve element, and being fixedly and biasably mounted along the lower width of said shroud housing, in biasable, communicating, adjacent interface with the inner pin-channel; and, as so mounted, being in biasable alignment, at its lower curve element thereof, with the pin connection channel of the transverse width component of the wiper frame assembly when the assembly is placed in a position to be channeled and connected within said shroud housing; and a flexible and non-sealing closure member, said closure member being releasably mounted on said shroud housing to extend outboard of the inner installation channel, such that it remains flexible and pivotable with the wiper blade assembly when the blade assembly is separately channeled and connected within the shroud housing, for assisting in insulation and preservation of heat generated within the shroud housing while also permitting fluids to exit from within the inner installation channel of the shroud housing.

18. The heated windshield wiper shroud system of claim 17, wherein said means for providing electrical heating comprises:

a first resistor heating element fixedly mounted with epoxy material adjacent and under said first lateral section, a first heating means retaining shield member fixedly and supportably mounted under said first resistor heating element for support and protection of the first resistor heating element;

a second resistor heating element fixedly mounted with epoxy material adjacent and under said second lateral section; and a second heating means retaining shield member fixedly and supportably mounted under said second resistor heating element for support and protection of the second resistor heating element;

said first and second resistor heating elements being activated by a electric current means supplied through said middle section of said shroud housing.

* * * * *